US012786855B2

(12) United States Patent
Orsino et al.

(10) Patent No.: US 12,786,855 B2
(45) Date of Patent: Nov. 3, 2026

(54) DUPLICATED SIB HANDLING IN SIDELINK RELAY

(71) Applicant: Telefonaktiebolaget LM Ericsson (publ), Stockholm (SE)

(72) Inventors: Antonino Orsino, Kirkkonummi (FI); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 345 days.

(21) Appl. No.: 18/278,831

(22) PCT Filed: Feb. 22, 2022

(86) PCT No.: PCT/EP2022/054389
§ 371 (c)(1),
(2) Date: Aug. 24, 2023

(87) PCT Pub. No.: WO2022/180028
PCT Pub. Date: Sep. 1, 2022

(65) Prior Publication Data

US 2024/0155470 A1 May 9, 2024

Related U.S. Application Data

(60) Provisional application No. 63/154,325, filed on Feb. 26, 2021.

(51) Int. Cl.
*H04W 48/16* (2009.01)
*H04W 48/12* (2009.01)
*H04W 88/04* (2009.01)

(52) U.S. Cl.
CPC .......... *H04W 48/16* (2013.01); *H04W 48/12* (2013.01); *H04W 88/04* (2013.01)

(58) Field of Classification Search
CPC .............................. H04W 48/12; H04W 48/16
(Continued)

(56) References Cited

U.S. PATENT DOCUMENTS

2019/0028954 A1 1/2019 Lee et al.
2019/0182747 A1* 6/2019 Chun .................. H04W 48/08
(Continued)

FOREIGN PATENT DOCUMENTS

EP 3554158 A1 10/2019
EP 3592103 A1 1/2020
WO 2018194390 A1 10/2018
WO 2018216774 A1 11/2018

OTHER PUBLICATIONS

InterDigital, "Summary document for AI 8.7.2.1", 3GPP TSG-RAN WG2 Meeting #113e, Jan. 25-Feb. 5, 2021, pp. 1-9, R2-2102237, 3GPP.
(Continued)

*Primary Examiner* — Faisal Choudhury
(74) *Attorney, Agent, or Firm* — COATS & BENNETT, PLLC

(57) ABSTRACT

According to an aspect, there is provided a method performed by a first wireless device for managing received system information blocks, SIBs. The first wireless device has a direct signalling connection to a base station and an indirect signalling connection to the base station via a relay wireless device. The method in the first wireless device comprises receiving a SIB of a first type from the base station; receiving a SIB of a second type from the relay wireless device; and applying the system information, SI, comprised in the received SIBs.

22 Claims, 20 Drawing Sheets

(58) Field of Classification Search
USPC .......................................................... 370/254
See application file for complete search history.

(56) References Cited

U.S. PATENT DOCUMENTS

| | | | | |
|---|---|---|---|---|
| 2020/0091991 | A1 | 3/2020 | Fujishiro et al. | |
| 2020/0344674 | A1* | 10/2020 | Ishii | H04W 48/14 |
| 2021/0266970 | A1* | 8/2021 | Lei | H04L 1/1812 |
| 2023/0180097 | A1* | 6/2023 | Zhang | H04B 7/1555<br>370/315 |
| 2024/0015637 | A1* | 1/2024 | Cheng | H04W 12/0471 |
| 2024/0031888 | A1* | 1/2024 | Cheng | H04W 48/12 |

OTHER PUBLICATIONS

ZTE, "Discussion on the system information delivery", 3GPP TSG RAN WG2 #98, Hangzhou, China, May 15-19, 2017, pp. 1-4, R2-1704637, 3GPP.

3rd Generation Partnership Project, "3rd Generation Partnership Project; Technical Specification Group Radio Access Network; NR; Radio Resource Control (RRC) protocol specification (Release 16)", Technical Specification, 3GPP TS 38.331 V16.3.1, Jan. 2021, pp. 1-932, 3GPP.

3rd Generation Partnership Project, "3rd Generation Partnership Project; Technical Specification Group Radio Access Network; NR; Physical layer procedures for control (Release 16)", Technical Specification, 3GPP TS 38.213 V16.4.0, Dec. 2020, pp. 1-181, 3GPP.

3rd Generation Partnership Project, "3rd Generation Partnership Project; Technical Specification Group Radio Access Network; NR; User Equipment (UE) procedures in Idle mode and RRC Inactive state (Release 16)", Technical Specification, 3GPP TS 38.304 V16.3.0, Dec. 2020, pp. 1-39, 3GPP.

3rd Generation Partnership Project, "3rd Generation Partnership Project; Technical Specification Group Radio Access Network; NR; NR and NG-RAN Overall Description; Stage 2 (Release 16)", Technical Specification, 3GPP TS 38.300 V16.4.0, Dec. 2020, pp. 1-149, 3GPP.

* cited by examiner

DUPLICATED SIB HANDLING IN SIDELINK RELAY

TECHNICAL FIELD

This disclosure relates to sidelink relay in which a first wireless device has a direct signalling connection to a base station and an indirect signalling connection to the base station via a relay wireless device.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

System Information Handling in New Radio (NR)/Lona Term Evolution (LTE)

The 3rd Generation Partnership Project (3GPP) document: 3rd Generation Partnership Project; Technical Specification Group Radio Access Network; NR; NR and NG-RAN Overall Description; Stage 2 (Release 16), 3GPP TS 38.300 v16.4.0 (2020 December) describes in Section 7.3.1:

System Information (SI) consists of a MIB [Master Information Block] and a number of SIBs [System Information Blocks], which are divided into Minimum SI and Other SI:

- Minimum SI comprises basic information required for initial access and information for acquiring any other SI. Minimum SI consists of:
- MIB contains cell barred status information and essential physical layer information of the cell required to receive further system information, e.g. CORESET #0 configuration. MIB is periodically broadcast on BCH.
- SIB1 defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.
- Other SI encompasses all SIBs not broadcast in the Minimum SI. Those SIBs can either be periodically broadcast on DL-SCH, broadcast on-demand on DL-SCH (i.e. upon request from UEs in RRC_IDLE or RRC_INACTIVE), or RRC_CONNECTED, or sent in a dedicated manner on DL-SCH to UEs in RRC_CONNECTED (i.e., upon request from UEs in RRC_CONNECTED or when the UE has an active BWP with no common search space configured). Other SI consists of:
  - SIB2 contains cell re-selection information, mainly related to the serving cell.
  - SIB3 contains information about the serving frequency and intra-frequency neighbouring cells relevant for cell re-selection (including cell re-selection parameters common for a frequency as well as cell specific re-selection parameters);
  - SIB4 contains information about other NR frequencies and inter-frequency neighbouring cells relevant for cell re-selection (including cell re-selection parameters common for a frequency as well as cell specific re-selection parameters);
  - SIB5 contains information about E-UTRA frequencies and E-UTRA neighbouring cells relevant for cell re-selection (including cell re-selection parameters common for a frequency as well as cell specific re-selection parameters);
  - SIB6 contains an ETWS primary notification;
  - SIB7 contains an ETWS secondary notification;
  - SIB8 contains a CMAS warning notification;
  - SIB9 contains information related to GPS time and Coordinated Universal Time (UTC);
- For sidelink, Other SI also includes:
  - SIB12 contains information related to NR sidelink communication;
  - SIB13 contains information related to SystemInformationBlockType21 for V2X sidelink communication as specified in TS 36.331 clause 5.2.2.28;
  - SIB4 contains information related to SystemInformationBlockType26 for V2X sidelink communication as specified in TS 36.331 clause 5.2.2.33.

FIGS. 7.3-1 [FIG. 1 in the accompanying drawings] summarises System Information provisioning.

For a cell/frequency that is considered for camping by the UE, the UE is not required to acquire the contents of the minimum SI of that cell/frequency from another cell/frequency layer. This does not preclude the case that the UE applies stored SI from previously visited cell(s).

If the UE cannot determine the full contents of the minimum SI of a cell by receiving from that cell, the UE shall consider that cell as barred.

In case of BA, the UE only acquires SI on the active BWP.

The 3GPP document: 3rd Generation Partnership Project; Technical Specification Group Radio Access Network; NR; Radio Resource Control (RRC) protocol specification (Release 16), 3GPP TS 38.331 v16.3.1 (2021 January) describes in Section 5.2.1:

System Information (SI) is divided into the MIB and a number of SIBs and posSIBs where:

- the MIB is always transmitted on the BCH with a periodicity of 80 ms and repetitions made within 80 ms (TS 38.212, clause 7.1) and it includes parameters that are needed to acquire SIB1 from the cell. The first transmission of the MIB is scheduled in subframes as defined in TS 38.213, clause 4.1 and repetitions are scheduled according to the period of SSB;
- the SIB1 is transmitted on the DL-SCH with a periodicity of 160 ms and variable transmission repetition periodicity within 160 ms as specified in TS 38.213, clause 13. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission repetition period is the same as the SSB period (TS 38.213, clause 13). SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SB) is cell-specific SIB;

SIBs other than SIB1 and posSIBs are carried in System-Informadon (SI) messages, which are transmitted on the DL-SCH. Only SIBs or posSIBs having the same periodicity can be mapped to the same SI message. SIBs and posSIBs are mapped to the different SI messages. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. An SI message may be transmitted a number of times within the SI-window. Any SIB or posSIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformationAreaID;

The mapping of SIBs to SI messages is configured in schedulingInfoList, while the mapping of posSIBs to SI messages is configured in posSI-SchedulingInfoList;

For a UE in RRC_CONNECTED, the network can provide system information through dedicated signalling using the RRCReconfiguration message, e.g. if the UE has an active BWP with no common search space configured to monitor system information or paging.

For PSCell and SCells, the network provides the required SI by dedicated signalling, i.e. within an RRCReconiguration message. Nevertheless, the UE shall acquire MIB of the PSCell to get SFN timing of the SCG (which may be different from MCG). Upon change of relevant SI for SCell, the network releases and adds the concerned SCell. For PSCell, the required SI can only be changed with Reconfiguration with Sync.

NOTE: The physical layer imposes a limit to the maximum size a SIB can take. The maximum SIB/or SI message size is 2976 bits.

Section 5.2.2.2.1 of 3GPP TS 38.331 v16.3.1 (2021 January) describes:

SIB Validity

The UE shall apply the SI acquisition procedure as defined in clause 5.2.2.3 upon cell selection (e.g. upon power on), cell-reselection, return from out of coverage, after reconfiguration with sync completion, after entering the network from another RAT, upon receiving an indication that the system information has changed, upon receiving a PWS notification, upon receiving a positioning request from upper layers; and whenever the UE does not have a valid version of a stored SIB.

When the UE acquires a MIB or a SIB1 or an SI message in a serving cell as described in clause 5.2.2.3, and if the UE stores the acquired SIB, then the UE shall store the associated areaScope, if present, the first PLMN-Identity in the PLMN-IdentityInfoList for non-NPN-only cells, the first NPN-Identity (SNPN identity in case of SNPN, or PNI-NPN identity in case of PNI-NPN, see TS 23.501) in the NPN-IdentityInfoList for NPN-only cells, the cellIdentity, the systemInformationAreaID, if present, and the valueTag, if present, as indicated in the si-SchedulingInfo for the SIB. The UE may use a valid stored version of the SI except MIB, SIB1, SIB6, SIB7 or SIB8 e.g. after cell re-selection, upon return from out of coverage or after the reception of SI change indication. The value tag for posSIB is optionally provided in LPP signalling Section 5.2.2.2.2 of 3GPP TS 38.331 v16.3.1 (2021 January) describes:

SI Change Indication and PWS Notification

A modification period is used, i.e. updated SI message (other than SI message for ETWS, CMAS and positioning assistance data) is broadcasted in the modification period following the one where SI change indication is transmitted. The modification period boundaries are defined by SFN values for which SFN mod m=0, where m is the number of radio frames comprising the modification period. The modification period is configured by system information. The UE receives indications about SI modifications and/or PWS notifications using Short Message transmitted with P-RNTI over DCI (see clause 6.5). Repetitions of SI change indication may occur within preceding modification period. SI change indication is not applicable for SI messages containing posSIBs.

UEs in RRC_IDLE or in RRC_INACTIVE shall monitor for SI change indication in its own paging occasion every DRX cycle. UEs in RRC_CONNECTED shall monitor for ST change indication in any paging occasion at least once per modification period if the UE is provided with common search space on the active BWP to monitor paging, as specified in TS 38.213 [13], clause 13.

ETWS or CMAS capable UEs in RRC_IDLE or in RRC_INACTIVE shall monitor for indications about PWS notification in its own paging occasion every DRX cycle. ETWS or CMAS capable UEs in RRC_CONNECTED shall monitor for indication about PWS notification in any paging occasion at least once every defaultPagingCycle if the UE is provided with common search space on the active BWP to monitor paging.

For Short Message reception in a paging occasion, the UE monitors the PDCCH monitoring occasion(s) for paging as specified in TS 38.304 [20] and TS 38.213.

On Demand System Information

On demand System Information request is a feature in NR that allows the network to only broadcast some of the system information messages when there is a User Equipment (UE) that needs to acquire it. The UE then requests such System Information messages using either msg1 or msg3 based procedures. The procedure allows a UE to request the needed content on demand and it allows the network to minimise the overhead in constantly broadcasting information that no UE is currently acquiring.

Further, some of the System Information messages can be provided to the UE also in dedicated state using the Radio Resource Control (RRC) Connection Reconfiguration message.

For the RRC On demand SI framework the parameter s-BroadcastStatus is used to indicate if an SI message is currently being broadcast or not.

si-BroadcastStatus ENUMERATED (broadcasting, notBroadcasting).

From the UE perspective, independent of whether an SI message is indicated as broadcasting or notBroadcasting, the UE obtains the SI scheduling information for the SI message from SIB1. If the SI message is indicated as broadcasting the UE can then directly acquire the SI message based on the SI scheduling information. However, if the SI message is indicated as notBroadcasting, the UE first needs to perform the on-demand SI request procedure to the base station in order to Initiate the transmission of the SI message (according to the SI scheduling information).

Currently, the on-demand broadcast for UEs in RRC_IDLE/INACTIVE is based upon below msg1 and msg3 solutions:

- Broadcast (Msg1 option):
  - Msg1 SI Request Random Access Channel (RACH) procedure (Physical RACH (PRACH), Random Access Response, "RAR")
  - Broadcast SI message (for some time)
- Broadcast (Msg3 option):
  - Msg3 SI Request RACH procedure (PRACH, RAR, RRCSysteminfoRequest, "Msg4")
  - Broadcast SI message (for some time)

Further in 3GPP, the below unicast (dedicated signalling) from idle/inactive is also currently being discussed.

- Unicast (from IDLE/INACTIVE):
  - Full RACH procedure (PRACH, RAR, RRC Setup/Resume Request, RRC Setup/Resume)
  - On demand request message
  - Dedicated SI message For the case of UEs in RRC_CONNECTED, SIBs can be requested on-demand and the granularity is per SIB. In order to do so, the UE sends the DedicatedSIBRequest message with the requested SIBs and the network may choose to broadcast them or to send them via dedicated signalling in the RRC reconfiguration message.

NR Vehicle-to-Anything (V2X)

Cellular Intelligent Transport Systems (ITS) aims at defining a new cellular eco-system for the delivery of vehicular services and their dissemination. Such a Cellular ITS (C-ITS) eco-system includes both short range and long range V2X service transmissions, as depicted in FIG. 2. In particular, short range communication involves transmissions over the Device-to-Device (D2D) link, also defined as sidelink or PC5 interface in 3GPP, towards other vehicular UEs or road-side units (RSU). On the other hand, for long range transmission, it considers the transmission over the Uu interface between a UE and a base station, in which case packets may be disseminated to different ITS service providers, which could be road traffic authorities, road operators, automotive original equipment manufacturers (OEMs), cellular operators, etc.

When it comes to the sidelink interface, the first standardisation effort in 3GPP dates back to Release (Rel.) 12, targeting public safety use cases. Since then, a number of enhancements have been introduced with the objective to enlarge the use cases that could benefit of the D2D technology. Particularly, in LTE Rel-14 and Rel-15, the extensions for the D2D work consists of supporting V2X communication, including any combination of direct communication between vehicles (vehicle-to-vehicle (V2V)), pedestrians (vehicle-to-pedestrians (V2P)) and infrastructure (vehicle-to-infrastructure (V2I)).

5G New Radio (M) has been able to realize V2X communications and autonomous driving since 3GPP Rel-16, i.e., referred to as NR V2X Compared to LTE Rel-15 V2X, NR V2X provides technical solutions for Quality of Service (QoS) management of the radio interface including both Uu (i.e. network-to-vehicle UE communication) and sidelink (i.e. vehicle UE-to-vehicle UE communication) used for V2X operations.

While LTE V2X mainly aims at traffic safety services, NR V2X has a much broader scope including not only basic safety services, but also targeting non-safety applications, such as extended sensor/data sharing between vehicles, with the objective to strengthen the perception of the surrounding environment of vehicles. Hence, a new set of applications have been captured in "Study on enhancement of 3GPP support for 5G V2X services' (3GPP TR 22.886 v16.2.0), such as advanced driving, vehicles platooning, cooperative manoeuvres between vehicles and remote driving that would require an enhanced NR system and new NR sidelink framework.

In this context, the expected requirements to meet the needed data rate, capacity, reliability, latency, communication range and speed are made more stringent. What is more, both communication interfaces, PC5 and Uu, could be used to support the advanced V2X use cases, taking into account radio conditions and the environment where the enhanced V2X (eV2X) scenario takes place. For example, given the variety of services that can be transmitted over the sidelink, a robust QoS framework which takes into account the different performance requirements of the different V2X services seems to be needed.

NR Sidelink Flow and Radio Bearer Configuration Provision

In NR, a sidelink (SL) QoS flow model is adopted. At a Non-Access Stratum (NAS) layer, UE maps one V2X packet into the corresponding SL QoS flow and then maps to a SL radio bearer at a Service Data Adaptation Protocol (SDAP) layer.

In NR, SL radio bearer (SLRB) configuration, including the QoS flow to SLRB mapping, is either preconfigured or configured by the network (NW) when the UE is in coverage. The provision of a NR SL radio bearer configuration provided from the NW is illustrated in FIG. 3. For instance, as shown in FIG. 3, when a UE wants to establish anew SL QoS flow/SLRB for a new service, it can send a request to the associated gNB/gNodeB. The request can include the QoS information of the service. The gNB then determines the appropriate SLRB configuration to support such SL QoS flow. After receiving the SLRB configuration from gNB, the UE establishes the local SLRB accordingly and prepare for data transmission over the SL. Note that to enable successful reception at the reception (RX) UE side, transmission (TX) UE might have to inform RX UE regarding necessary parameters, e.g. sequence number space for PDCP/RLC, before the data transmission starts.

SUMMARY

There currently exist certain challenge(s). For the sidelink relay scenario (i.e. where a UE (referred to as the 'relay UE') acts or could act as a relay for another UE (referred to as the 'remote UE') towards the radio access network (RAN)), a remote UE may also be camping in the same cell of a possible relay UE. This can mean that the remote UE receives the same SIB(s) via Uu (gNB) and PC5 (relay UE).

Given that the same SIB may be received shifted in time (since the relay path (i.e. the path via the relay UE) may be slower than the broadcast over Uu path, or vice versa) the remote UE may apply a SIB that in reality is outdated.

Further, if the same SIB is received within the same modification period via both Uu and PC5, one of the SIB may be discarded in order to avoid applying the same configuration twice.

According to the two issues described above, at the moment there is no mechanism for the UE to determine how to proceed, e.g. no mechanism setting out how to decide which SIB should be discarded and which one should be considered as valid, if either.

Also, given the possible scenario described above, is not clear how or whether the UE may prioritise the reception of the SIB(s) via one path (i.e. Uu or PC5) with respect to the other.

Certain aspects of the present disclosure and their embodiments may provide solutions to these or other challenges. The methods and solutions in this disclosure target to allow the remote (RM) UE to correctly receive the SIBs that may be received from the network (e.g. broadcast or sent via dedicated signalling) or from the relay (RL) UE. In doing this, these possible options are proposed:

- If the UE receives, in the same modification period, the same SIB from the network and from the RL UE, the RM UE applies the SIB received from the network and discards the one received from the RL UE.
- If the UE receives, in the same modification period, the same SIB from the network and from the RL UE, the RM UE applies the SIB received from the RL UE and discards the one received from the network.
- If the UE receives, in the same modification period, the same SIB from the network and from the RL UE, the RM UE applies the first SIB received and discards the last one received.
- If the UE receives, in the same modification period, the same SIB from the network and from the RL UE, the RM UE applies the last SIB received and discards the first one received.
- If the UE receives, in the same modification period, the same SIB from the network and from the RL UE, the RM UE discards the SIB received from the network if in the SIB received from the RL UE there is an indication that additional information has been added on top of the SIB generated by the network.
- If the UE receives, in the same modification period, the same SIB from the network and from the RL UE, the RM UE discards both the SIB received from the network and the SIB received from the RL UE.
- The network configures the UE to use only the SIB(s) received from the network or received via the relay UE.

There are, proposed herein, various embodiments which address one or more of the issues disclosed herein.

Some embodiments provide a method performed by a first wireless device for managing received SIBs. The first wireless device has a direct signalling connection to a base station, and an indirect signalling connection to the base station via a relay wireless device. The method in the first wireless device comprises receiving a SIB of a first type from the base station and receiving another SIB of the first type from the relay wireless device; and either applying system information, SI, comprised in one of the received SIBs, or discarding both SIBs.

Some embodiments provide a method performed by a first wireless device for managing received SIBs. The first wireless device has a direct signalling connection to a base station and an indirect signalling connection to the base station via a relay wireless device. The method in the first wireless device comprises receiving a SIB of a first type from the base station; receiving a SIB of a second type from the relay wireless device; and applying the SI comprised in the received SIBs.

Some embodiments provide a method performed by a first wireless device for managing received SIBs. The first wireless device has a direct signalling connection to a base station and an indirect signalling connection to the base station via a relay wireless device. The method in the first wireless device comprises receiving one or more SIBs from the base station; transmitting an indication to the relay wireless device that the relay wireless device is not to transmit SIBs to the first wireless device; and applying the SI comprised in the received SIBs.

Some embodiments provide a method performed by a relay wireless device. A first wireless device has a direct signalling connection to a base station, and an indirect signalling connection to the base station via the relay wireless device. The method in the relay wireless device comprises receiving a SIB from the base station; adding and/or changing SI in the SIB to form a further SIB that includes an indication that content of the further SIB is different to the content of the SIB received from the base station; and sending the further SIB to the first wireless device.

Some embodiments provide a method performed by a relay wireless device. A first wireless device has a direct signalling connection to a base station, and an indirect signalling connection to the base station via the relay wireless device. The method in the relay wireless device comprises transmitting one or more SIBs to the first wireless device, the SIB(s) comprising relay-related SI.

Some embodiments provide a method performed by a relay wireless device. A first wireless device has a direct signalling connection to a base station, and an indirect signalling connection to the base station via the relay wireless device. The method in the relay wireless device comprises receiving an indication from the first wireless device indicating that the relay wireless device is not to transmit SIBs to the first wireless device; and stopping the transmission of SIBs to the first wireless device.

Some embodiments provide a method performed by a base station. A first wireless device has a direct signaling connection to the base station, and an indirect signalling connection to the base station via a relay wireless device. The method in the base station comprises receiving an indication from the first wireless device to indicate that the base station is to stop providing one or more SIBs comprising relay-related SI to the first wireless device; and transmitting one or more SIBs comprising non-relay-related SI to the first wireless device.

Some embodiments provide a computer program product comprising a computer readable medium having computer readable code embodied therein. The computer readable code being configured such that, on execution by a suitable computer or processor, the computer or processor is caused to perform the method of any of the above embodiments.

Some embodiments provide apparatus, for example in the form of a wireless device or base station, that are configured to perform any of the above method embodiments.

Some embodiments provide apparatus, for example in the form of a wireless device or base station, that comprise a processor and a memory, the memory containing instructions executable by the processor whereby said apparatus is operative to perform any of the above method embodiments.

Certain embodiments may provide one or more of the following technical advantage(s). According to the methods and solutions disclosed herein, the RM UE can avoid applying the same SIB twice, and some embodiments can also guarantee or enable that the SIB applied by the UE is the most updated one.

Certain embodiments can enable the RM UE to property establish a UE-to-NW relay path with the RL UE and gNB and to get up-to-date system information when the content of the SIB(s) changes.

BRIEF DESCRIPTION OF THE DRAWINGS

Some of the embodiments contemplated herein will now be described more fully with reference to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Although the embodiments are described herein in the context of the radio access technology (RAT) being NR, i.e. a remote UE and a relay UE are deployed in (camping on) a same NR cell, it will be appreciated that the embodiments are also applicable to other relay scenarios including a UE-to-network relay UE where the link between a remote UE and a relay UE may be based on LTE sidelink or NR sidelink, i.e. the Uu connection between a relay UE and a base station (eNB or gNb as appropriate) may be LTE Uu or NR Uu. The connection between a remote UE and a relay UE is also not limited to sidelink (e.g. NR sidelink or LTE sidelink). Any short-range communication technology such as WiFi or Bluetooth could be used instead. The disclosed embodiments can also be applied to a relay scenario where the relay UE is configured with multiple connections to the RAN (i.e. the number of connections is equal to or larger than two), e.g. using dual connectivity (DC), carrier aggregation (CA), etc.

The disclosed embodiments are applicable at least to Layer 2 (L2) relay scenarios. Thus, a L2 UE-to-Network Relay UE (referred to herein as a 'relay UE') can provide forwarding functionality that can relay traffic over a PC5 link, and can also provide the functionality to support connectivity to the 5G System (5GS) for one or more remote UEs. A UE can be considered to be a remote UE if the UE has successfully established a PC5 link to the relay UE. In the scenarios described herein, the remote UE is located within the same next generation radio access network (NG-RAN) coverage as the relay UE (i.e. the remote UE also has coverage from the radio access network (RAN)), and in particular the remote UE is camping on the same cell as the relay UE. With cell selection, the UE searches for a suitable cell of the selected Public Land Mobile Network (PLMN), chooses that cell to provide available services, and monitors its control channel. This procedure is defined as "camping on the cell".

The term 'direct path' is used herein to represent a direct connection from a remote UE to a gNB (the term for a 'base station' in NR) and the term 'indirect path' is used herein to represent an indirect connection between a remote UE and a gNB via an Intermediate node—the relay UE.

Figure 1:
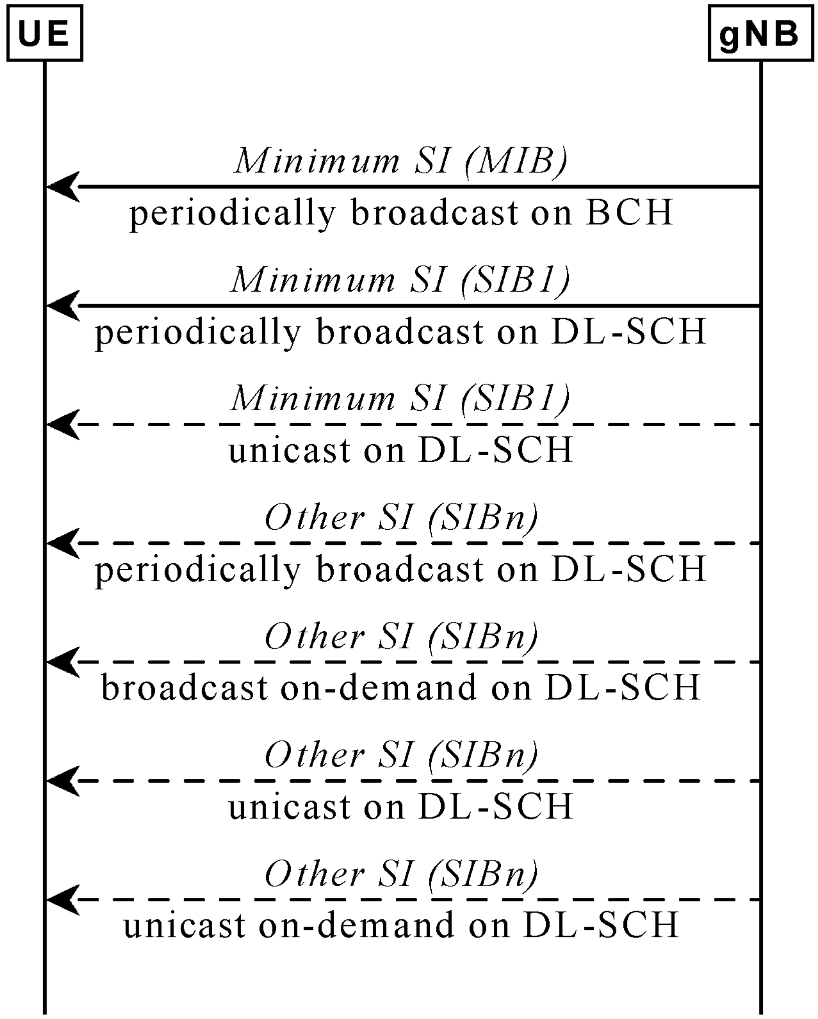
FIG. 1 summarises System Information provisioning and corresponds to FIGS. 7.3-1 in 3GPP TS 38.300 v16.4.0 (2020 December)
Figure 2:
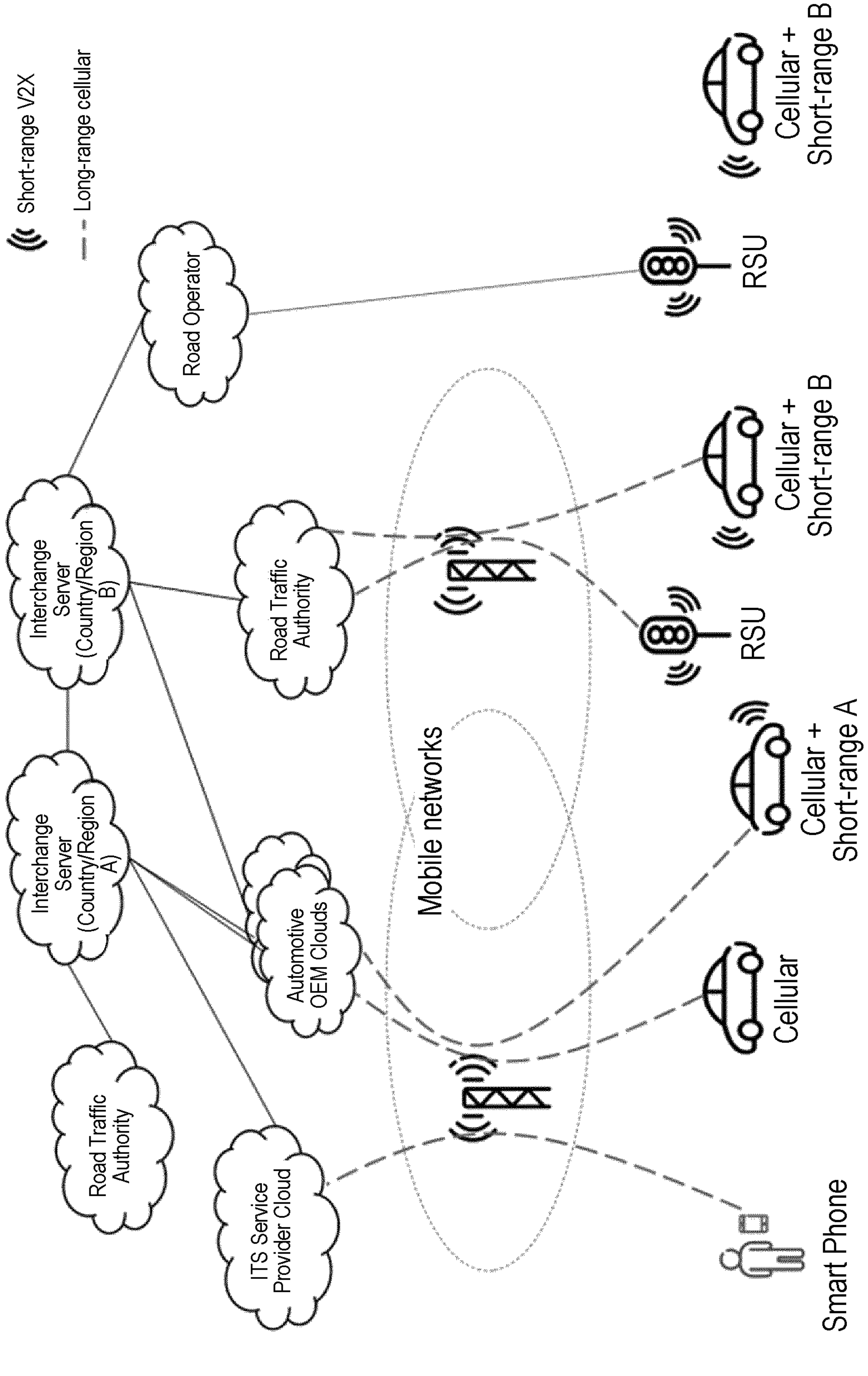
FIG. 2 illustrates a C-ITS eco-system.
Figure 3:
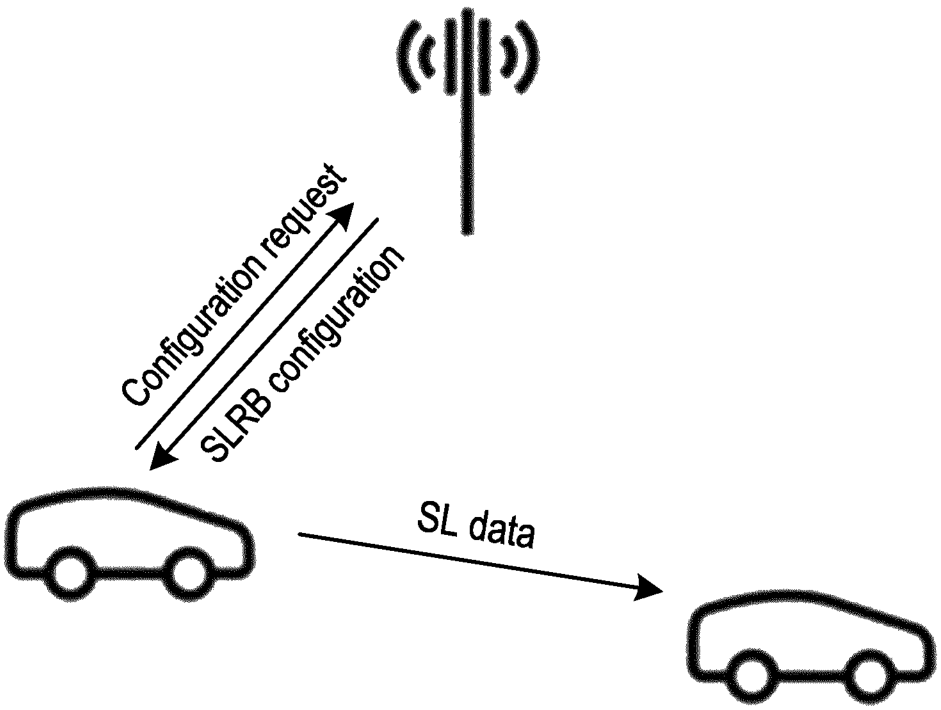
FIG. 3 illustrates the provision of a NR SL radio bearer configuration provided from the NW.
Figure 4:
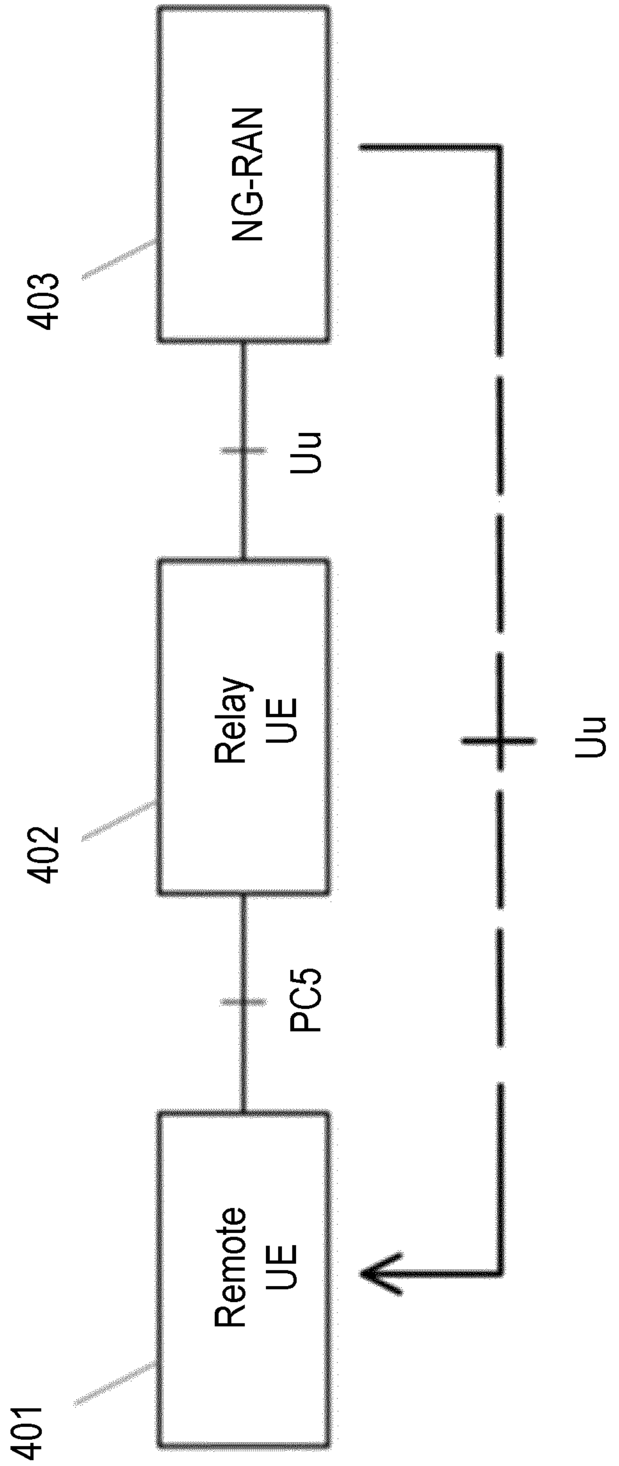
FIG. 4 illustrates an arrangement of a remote UE, a relay UE and a base station in a sidelink scenario where the remote UE is also camping on the same base station as the relay UE.

FIG. 4 illustrates an arrangement of a remote UE, a relay UE and a base station in a sidelink scenario where the remote UE is also camping on the same base station as the relay UE, and in particular the remote UE is camping on the same cell as the relay UE.

Thus, FIG. 4 shows a remote UE 401 that is connected via a relay UE 402 (e.g. a Proximity Services (ProSe) UE-to-Network Relay) to the NG-RAN 403. The NG-RAN 403 can be a NR RAN, and more specifically the NG-RAN 403 can be a base station, such as a gNB or eNB. The relay UE 402 can be a dedicated relay device, or a typical UE that can selectively operate as a relay UE 402. In the case of a 3GPP technology-based relay scenario, the interface between the remote UE 401 and the relay UE 403 can be a PC5 interface, and the interface between the relay UE 402 and the RAN 403 is the Uu interface. The relay UE entity 402 provides the functionality to support connectivity to the network 403 for remote UEs 401. It can be used for both public safety services and commercial services (e.g. an interactive service). The remote UE 401 is also in coverage (IC) of the network and is camping on the same cell of the NG-RAN 403 as the relay UE 402, and thus the remote UE 401 has a Uu connection with the NG-RAN 403.

In a first group of embodiments, the RM UE 401, at the beginning of a modification period, starts to acquire one or more system information block(s) SIB(s). A modification period is a defined period of time in which system information (SI) can be changed by the network, and is a period of time in which SI is transmitted/broadcast by the network. Updated SI (i.e. updated SIB(s)) can be transmitted/broadcast in a modification period following a modification period in which an SI change notification is transmitted. The modification period boundaries are defined by system frame number (SFN) values for which SFN mod m=0, where m is the number of radio frames comprising the modification period. The modification period can itself be configured by system information.

The acquisition of the SIB(s) may be triggered in the RM UE 401 for any of the following reasons:

Upper layers require the RM UE 401 to re-acquire the SIB (the application of the UE needs periodical updates of the field that are contained in SIB(s)).

The validity of the stored SIB(s) is expired (i.e. stored SIB(s) are no longer valid).

The RM UE 401 receives an indication (from the network (e.g. NG-RAN 403) or RL UE 402) that the content of one or more SIB(s) has changed.

The RM UE 401 needs to establish a (relay) connection and needs to acquire one or more SIBs (e.g. for the first time) in order to trigger the procedure.

When acquiring the needed SIB(s), if the RM UE 401 receives, in the same modification period, the same SIB(s) from both the network 403 (via dedicated signaling or via broadcast signaling) and the RL UE 402, the RM UE 401 needs to decide how to handle these SIB(s). In this respect, receiving the 'same' SIB means receiving an SIB of the same type from the network 403 and the RL UE 402, although it is possible for the content of those 'same' SIBs to be different to each other. Thus, receiving the same SIB can include, for example, receiving an SIB2 from the network 403 and also receiving an SIB2 from the RL UE 402 in the same modification period. Thus, the RM UE 401 may apply one of the following options:

Option 1. The SIB received from the network is applied by the RM UE and the one received from the RL UE is discarded.

Option 2. The SIB received from the RL UE is applied by the RM UE and the one received from the network is discarded.

Option 3. The SIB received first/earliest is applied by the RM UE and the rest one/ones is/are discarded.

Option 4. The SIB received last is applied by the RM UE and the rest one/ones is/are discarded.

Option 5. Both SIBs are discarded by the RM UE.

In a second group of embodiments, similar to the first group of embodiments, the RM UE 401 is able to receive SIBs from both the network 403 and the RL UE 402. When the RL UE is sending the SIB(s) to the RM UE, the RL UE may decide to complement the content of the SIB (which the RL UE received from the gNB) with additional information, for example that may be important for establishing the relay path with RM UE. In this case, in order to inform the RM UE that the content of the SIB is different from that one broadcast (or sent via dedicated signaling) by the network, the RL UE can include an indication in the SIB that is sent to the RM UE. If this is the case, when the RM UE receives, in the same modification period, the SIB(s) from both the network (via dedicated signaling or via broadcast signaling) and the RL UE, the RM UE can discard the SIB(s) received from the network and apply the SIB(s) received from the RL UE (if the indication is present in the SIB(s) sent by the RL UE).

The indication in the SIB may be a single bit used to indicate if the SIB is different from the SIB sent by the network, or the indication in the SIB can be a more complex indication. For instance, the indication may include a time stamp on when the SIB was created, and/or which information has been added or changed with respect to the SIB sent by the network.

In a third group of embodiments, the RM UE 401 can receive different SIBs from the network 403 and the RL UE 402 separately. That is, the RM UE can receive certain SIB(s) from the network, and certain other (different) SIB(s) from the RL UE. In an example, the RM UE may receive non-relay-related SIBs from the network, while the RM UE receives relay-related SIBs from the RL UE. A relay-related SIB includes SIB types which include information necessary for a RM UE to choose the RL UE and to establish the UE-NW relay path. SIB types that do not include this type of information are considered as non-relay-related SIBs. In an example, V2X services can be supported via SL UE to network relay. In this case, SIB13 and SIB14, which are for V2X communication, may be considered as relay-related SIBs.

In a fourth group of embodiments, after a relay path has been established between the RM UE 401 and the RL UE 402, the RM UE may stop acquiring the SIB(s) related to sidelink and sidelink relay from the network 403 and instead acquire these SIBs only via the relay UE. In doing this, the RM UE may send an indication to the RL UE to inform the RL UE that during the time the relay path is up and running (established), it is the responsibility of the RL UE to forward the necessary SIBs to the RM UE. At the same or a similar time, the RM UE may also send an indication (e.g. via RRC signaling) to the network to inform the network that the sidelink and sidelink relay SIBs are no longer needed (by the RM UE). In such a case, the network may still continue to broadcast the sidelink and/or sidelink relay SIBs within its coverage, but it will stop sending (or not send) those SIBs via dedicated RRC signaling to the RM UE.

Alternatively, after a relay path has been established between the RM UE and the RL UE, the RM UE may decide to continue to acquire the SIBs only via the network and not via the RL UE. In such a case, the RM UE may send an indication (e.g. via PC5-RRC, MAC CE or control PDU of a protocol layer) to the RL UE to inform the RL UE that no SIBs should be delivered by the RL UE during the time the relay path is up and running.

In a fifth group of embodiments, it is up to the UE implementation whether to adopt any of the solutions described any one of embodiments. That is, the implementation of a UE can cause the UE to operate according to any of the first, second, and third groups of embodiments when the UE has a relay connection to the network via a relay UE and when the UE also has a direct connection to the network.

In a sixth set of embodiments, which, if any, actions the remote UE should perform according to any of the above groups of embodiments can be configured by the network/gNB via dedicated Uu RRC signaling or SIBs. For example the network/gNB can configure the remote UE to operate according a particular one of the options in the first group of embodiments, the second embodiment, the third embodiment, or the fourth embodiment. Alternatively, the remote UE can be pre-configured with an action(s) to perform according to any of the above groups of embodiments. For example the remote UE can be pre-configured to operate according a particular one of the options in the first group of embodiments, the second embodiment, the third embodiment, or the fourth embodiment. Alternatively, which, if any, actions the remote UE should perform according to any of the above groups of embodiments may also be configured by the relay UE or a controlling UE via direct PC5 RRC signaling or sidelink broadcast/groupcast. For example the relay UE can configure the remote UE to operate according a particular one of the options in the first group of embodiments, the second embodiment, the third embodiment, or the fourth embodiment.

The flow charts in FIGS. 5-11 relate to methods performed by a remote wireless device (also referred to herein as a first wireless device), a relay wireless device and a base station. In each of these methods, the first wireless device has a direct signalling connection to the base station and an indirect signalling connection to the base station via the relay wireless device. These methods correspond or comprise one or more of the above described sets of embodiments.

The methods may be performed by suitably configured user equipments, wireless devices, base stations or network nodes, as appropriate. In some embodiments, a UE, wireless device, base station or network node may perform the method in response to a computer or processor executing computer readable code embodied on a computer readable medium.

Figure 5:
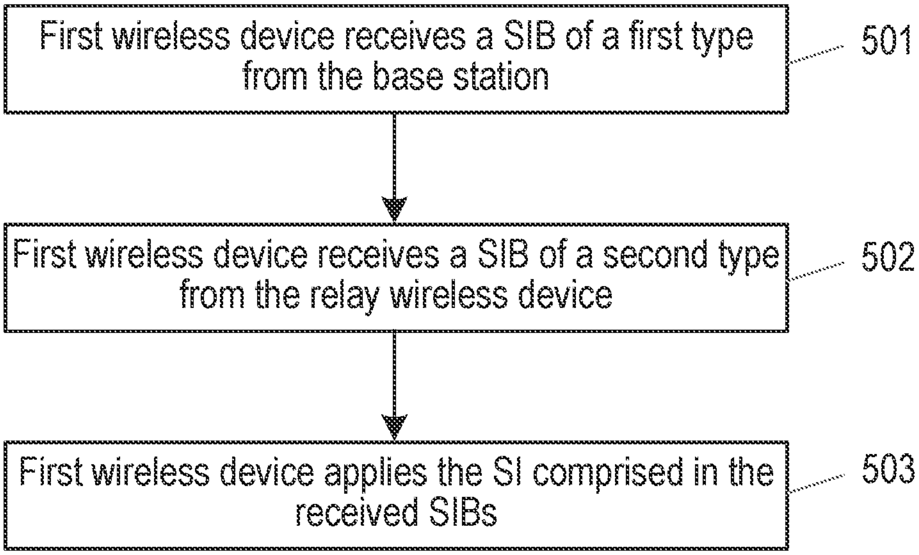
FIG. 5 is a flow chart illustrating a method performed by a first wireless device according to an aspect.

The flow chart in FIG. 5 relates to a method of operating a first wireless device (remote wireless device) to manage received SIBs. The method in FIG. 5 relates to the third set of embodiments, to some of the fourth set of embodiments, and to the fifth and sixth sets of embodiments.

In step 501, the first wireless device receives a SIB of a first type from the base station.

In step 502, the first wireless device receives a SIB of a second type from the relay wireless device. Steps 501 and 502 can occur in any order.

In step 503, the first wireless device applies the SI comprised in the received SIBs.

In some embodiments, the SIB of the first type comprises non-relay-related SI, and the SIB of the second type comprises relay-related SI.

In these embodiments, the method can further comprise transmitting an indication to the relay wireless device to indicate that the relay wireless device is to provide one or more SIBs comprising relay-related SI to the first wireless device. In these embodiments, the method can alternatively or additionally comprise transmitting an indication to the base station to indicate that the base station is to provide one or more SIBs comprising non-relay-related SI to the first wireless device.

In some embodiments, the method may further comprise one or both of the first wireless device stopping the acquisition of one or more SIBs comprising relay-related SI from the base station, and stopping acquisition of one or more SIBs comprising non-relay-related SI from the relay wireless device. In these embodiments, stopping acquisition of one or more SIBs comprising relay-related SI from the base station may comprise transmitting an indication to the RAN node that the base station is to stop transmitting one or more SIBs comprising relay-related SI to the first wireless device.

Figure 6:
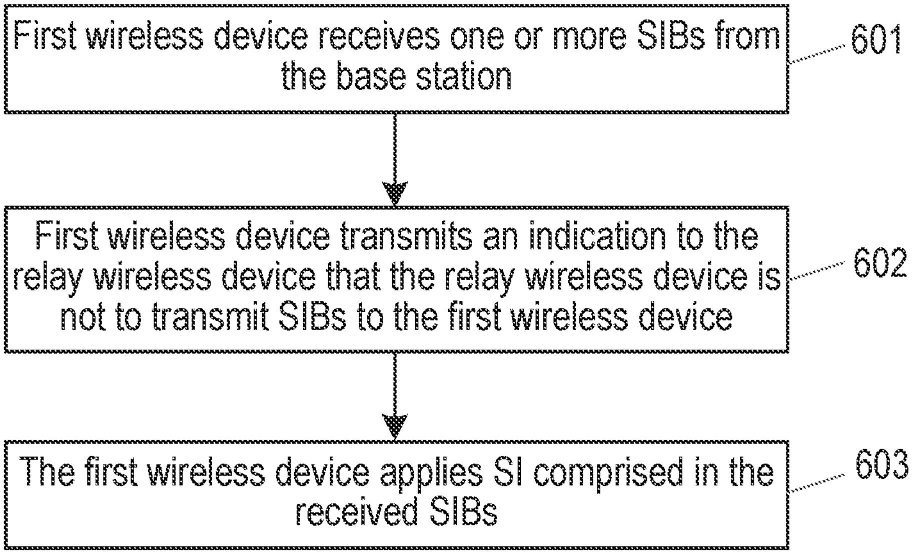
FIG. 6 is a flow chart illustrating a method performed by a first wireless device according to another aspect.

The flow chart in FIG. 6 relates to a method of operating a first wireless device (remote wireless device) to manage received SIBs. The method in FIG. 6 relates to some of the fourth set of embodiments and to the fifth and sixth sets of embodiments.

In step 601, the first wireless device receives one or more SIBs from the base station.

In step 602, the first wireless device transmits an indication to the relay wireless device that the relay wireless device is not to transmit SIBs to the first wireless device.

In step 603, the first wireless device applies the SI comprised in the received SIBs.

In some embodiments, step 603 can comprise one of a. applying the SI comprised in the SIB received from the base station, and optionally discarding the SIB received from the relay wireless device;
b. applying the SI comprised in the SIB received from the relay wireless device, and optionally discarding the SIB received from the base station;
c. applying the SI comprised in the earliest/first received SIB, and optionally discarding the latest/most recently/second received SIB;
d. applying the SI comprised in the latest/most recently/second received SIB, and optionally discarding the earliest/first received SIB; and
e. discarding the SIBs received from the base station and the relay wireless device.

In the above embodiment, the method can further comprise the first wireless device receiving (from the relay wireless device or the base station), an indication of which of a., b., c., and d. are to be performed to apply the SI comprised in one of the received SIBs.

In alternative embodiments, the method can further comprise the first wireless device determining if the SIB received from the relay wireless device comprises an indication that the content of the SIB received from the relay wireless device is different to the content of the SIB received from the base station.

Figure 7:
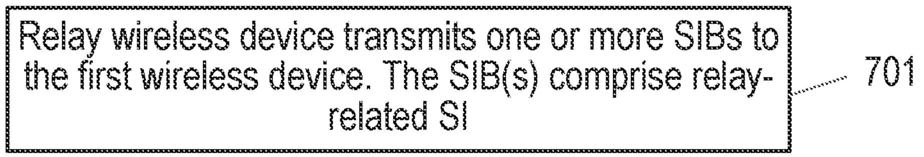
FIG. 7 is a flow chart illustrating a method performed by a relay wireless device according to another aspect.

The flow chart in FIG. 7 relates to a method of operating a relay wireless device. The method in FIG. 7 relates to the third set of embodiments, to some of the fourth set of embodiments and to the fifth and sixth sets of embodiments.

In step 701, the relay wireless device transmits one or more SIBs to the first wireless device. The SIB(s) comprise relay-related SI.

In some embodiments, the method further comprises the relay wireless device receiving an indication from the first wireless device to indicate that the relay wireless device is to provide one or more SIBs comprising relay-related SI to the first wireless device.

In some embodiments, the method further comprises the relay wireless device transmitting an indication to the first wireless device to indicate an action to perform to apply SI comprised in one or more SIBs received by the first wireless device. In these embodiments, the transmitted indication may indicate one of the following actions for the first wireless device to perform in order to apply SI:

a. apply the SI comprised in a SIB received from the base station, and optionally discard a SIB received from the relay wireless device;
b. apply the SI comprised in a SIB received from the relay wireless device, and optionally discard a SIB received from the base station;
c. apply the SI comprised in an earliest/first received SIB, and optionally discard a latest/most recently/second received SIB;
d. apply the SI comprised in a latest/most recently/second received SIB, and optionally discard an earliest/first received SIB;
e. discard SIBs received from the base station and the relay wireless device; and
f. determine if a SIB received from the relay wireless device comprises an indication that the content of the SIB received from the relay wireless device is different to the content of the SIB received from the base station.

Figure 8:
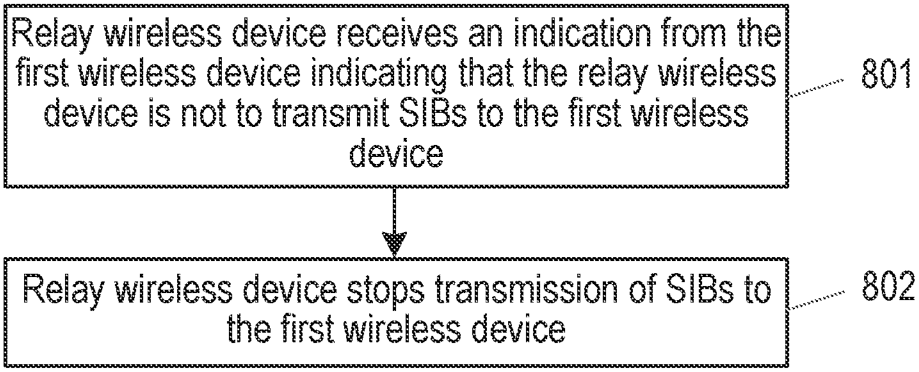
FIG. 8 is a flow chart illustrating a method performed by a relay wireless device according to an aspect.

The flow chart in FIG. 8 relates to a method of operating a relay wireless device. The method in FIG. 8 relates to some of the fourth set of embodiments and to the fifth and sixth sets of embodiments.

In step 801, the relay wireless device receives an indication from the first wireless device indicating that the relay wireless device is not to transmit SIBs to the first wireless device.

In step 802, the relay wireless device stops the transmission of SIBs to the first wireless device.

In some embodiments, the method further comprises the relay wireless device transmitting an indication to the first wireless device to indicate an action to perform to apply SI comprised in one or more SIBs received by the first wireless device.

The transmitted indication can indicate one of the following actions for the first wireless device to perform to apply SI:

a. apply the SI comprised in a SIB received from the base station, and optionally discard a SIB received from the relay wireless device;
b. apply the SI comprised in a SIB received from the relay wireless device, and optionally discard a SIB received from the base station;
c. apply the SI comprised in an earliest/first received SIB, and optionally discard a latest/most recently/second received SIB;
d. apply the SI comprised in a latest/most recently/second received SIB, and optionally discard an earliest/first received SIB;
e. discard SIBs received from the base station and the relay wireless device; and
f. determine if a SIB received from the relay wireless device comprises an indication that the content of the SIB received from the relay wireless device is different to the content of the SIB received from the base station.

Figure 9:
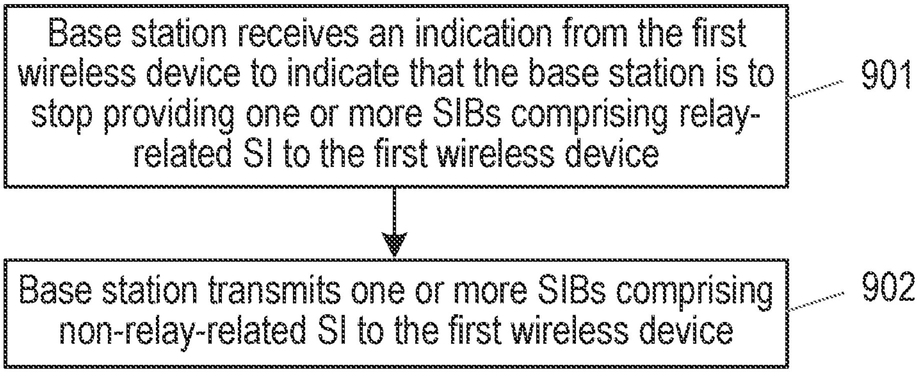
FIG. 9 is a flow chart illustrating a method performed by a base station according to another aspect.

The flow chart in FIG. 9 relates to a method of operating a base station. The method in FIG. 9 relates to the fourth set of embodiments described above.

In step 901, the base station receives an indication from the first wireless device to indicate that the base station is to stop providing one or more SIBs comprising relay-related SI to the first wireless device.

In step 902, the base station transmits one or more SIBs comprising non-relay-related SI to the first wireless device.

In some embodiments, wherein the method further comprises the base station broadcasting one or more SIBs comprising relay-related SI.

In some embodiments, the method further comprises the base station transmitting an indication to the first wireless device to indicate an action to perform to apply SI comprised in one or more SIBs received by the first wireless device.

The transmitted indication can indicate one of the following actions for the first wireless device to perform to apply SI:

a. apply the SI comprised in a SIB received from the base station, and optionally discard a SIB received from the relay wireless device;
b. apply the SI comprised in a SIB received from the relay wireless device, and optionally discard a SIB received from the base station;
c. apply the SI comprised in an latest/first received SIB, and optionally discard a latest/most recently/second received SIB;
d. apply the SI comprised in a latest/most recently/second received SIB, and optionally discard an earliest/first received SIB;
e. discard SIBs received from the base station and the relay wireless device; and
f. determine if a SIB received from the relay wireless device comprises an indication that the content of the SIB received from the relay wireless device is different to the content of the SIB received from the base station.

Figure 10:
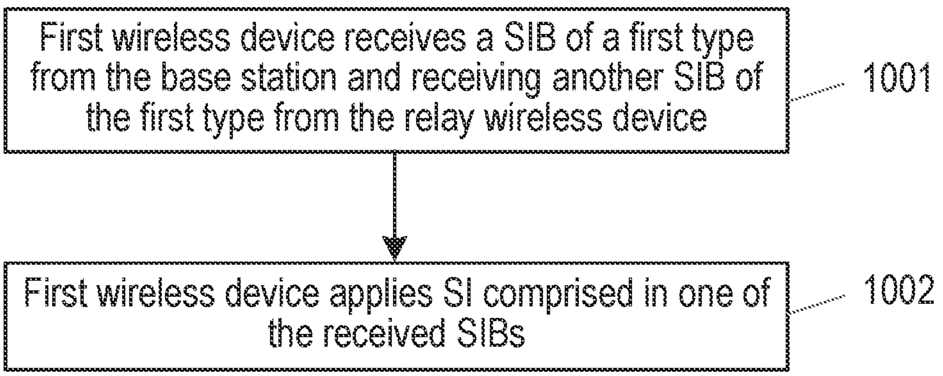
FIG. 10 is a flow chart illustrating a method performed by a first wireless device according to another aspect.

The flow chart in FIG. 10 relates to a method of operating a first wireless device (remote wireless device). The method in FIG. 10 relates to the first and second sets of embodiments, and to the fifth and sixth sets of embodiments.

In step 1001 the first wireless device receives a SIB of a first type from the base station and receiving another SIB of the first type from the relay wireless device.

In step 1002 the first wireless device applies SI comprised in one of the received SIBs.

In some embodiments, step 1002 comprises one of a. applying the SI comprised in the SIB received from the base station, and optionally discarding the SIB received from the relay wireless device;
b. applying the SI comprised in the SIB received from the relay wireless device, and optionally discarding the SIB received from the base station;
c. applying the SI comprised in the earliest/first received SIB, and optionally discarding the latest/most recently/second received SIB;
d. applying the SI comprised in the latest/most recently/second received SIB, and optionally discarding the earliest/first received SIB; and
e. discarding the SIBs received from the base station and the relay wireless device.

In some embodiments, the method further comprises the first wireless device determining if the SIB received from the relay wireless device comprises an indication that the content of the SIB received from the relay wireless device is different to the content of the SIB received from the base station. In these embodiments, step 1002 can comprise applying the SI comprised in the SIB received from the relay wireless device if the SIB received from the relay wireless device comprises the indication, and optionally discarding the SIB received from the base station.

In these embodiments, the indication can comprise a value of a bit in the SIB, a timestamp indicating a time that the SIB was created, and/or information on SI that is different in the SIB received from the relay wireless device to SI in the SIB received from the base station.

In some embodiments, the SIB received from the base station and the SIB received from the relay wireless device are received in the same modification period.

In some embodiments, the SIB received from the base station is received via dedicated signalling or broadcast signaling.

Figure 11:
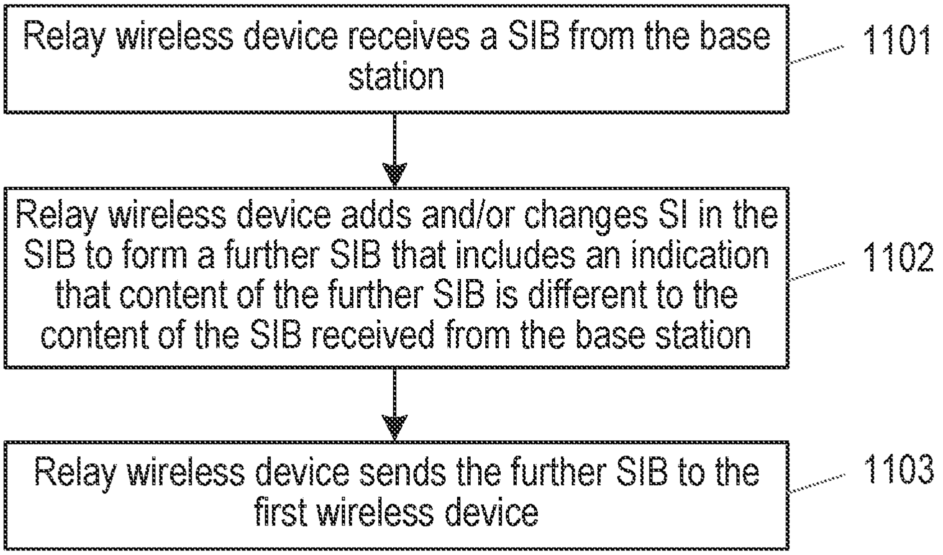
FIG. 11 is a flow chart illustrating a method performed by a relay wireless device according to an aspect.

The flow chart in FIG. 11 relates to a method of operating a relay wireless device. The method in FIG. 11 relates to the first and second sets of embodiments, and to the fifth and sixth sets of embodiments.

In step 1101, the relay wireless device receives a SIB from the base station.

In step 1102, the relay wireless device adds and/or changes SI in the SIB to form a further SIB that includes an indication that content of the further SIB is different to the content of the SIB received from the base station.

In step 1103, the relay wireless device sends the further SIB to the first wireless device.

In some embodiments, the indication comprises a value of a bit in the further SIB, a timestamp indicating a time that the further SIB was created, and/or information on SI that is different in the further SIB to the SIB received from the base station.

Figure 12:
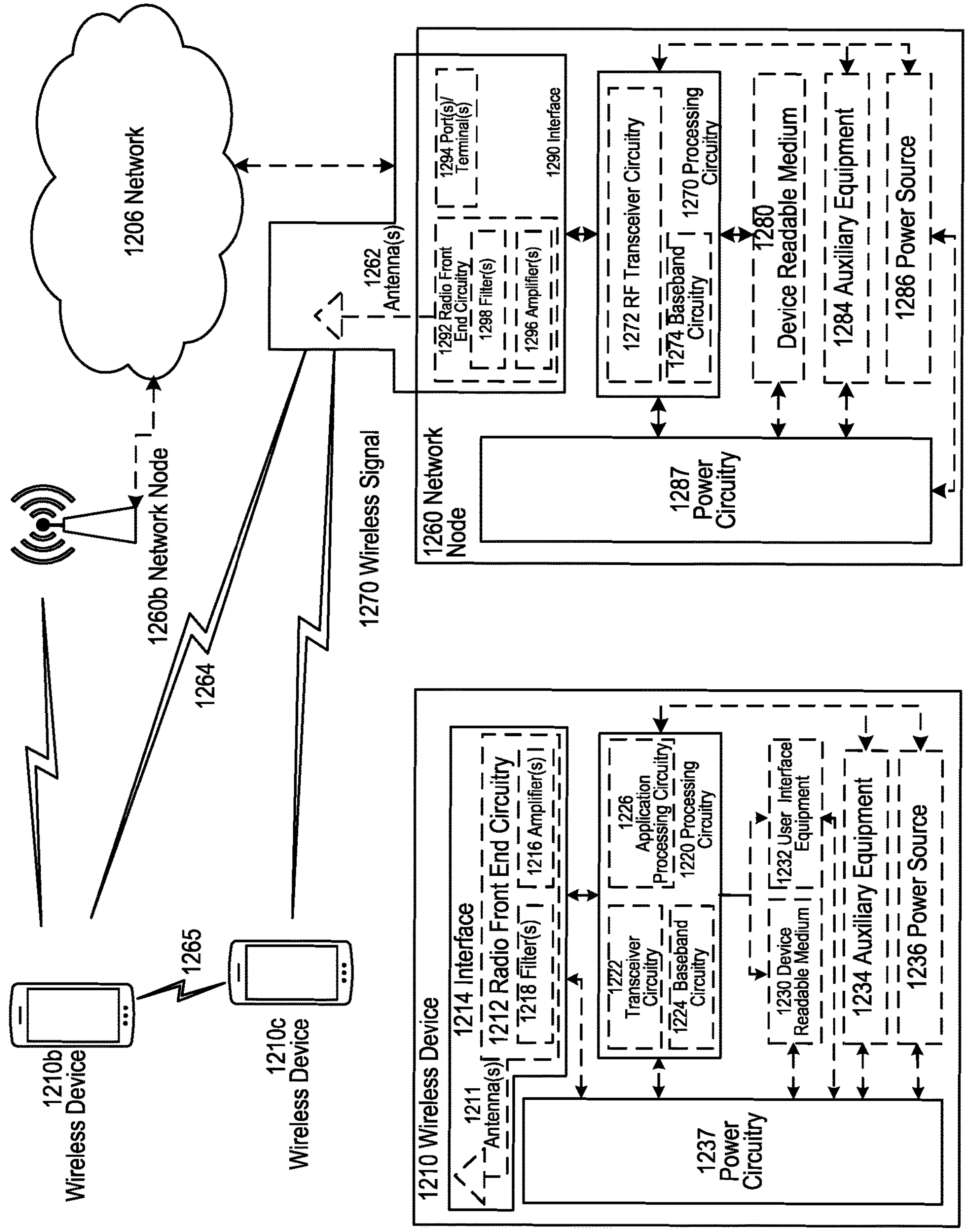
FIG. 12 shows an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O & M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units.

In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals 1264, 1265. In FIG. 12, WD 1210*b* can be considered as operating as a relay UE for WD 1210*c*, which is operating as a remote UE that may (or may not) have a connection (or perhaps coverage) from the network nodes 1260. Antenna 1262 may be coupled to radio front end circuitry 1292 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Any of the WDs can operate as a relay UE as described herein, or as a remote UE as described herein. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cel phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2) communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, Interface 1214 comprises radio front end circuitry 1212 and antenna 1211. Radio front end circuitry 1212 comprise one or more filters 1218 and amplifiers 1216. Radio front end circuitry 1212 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
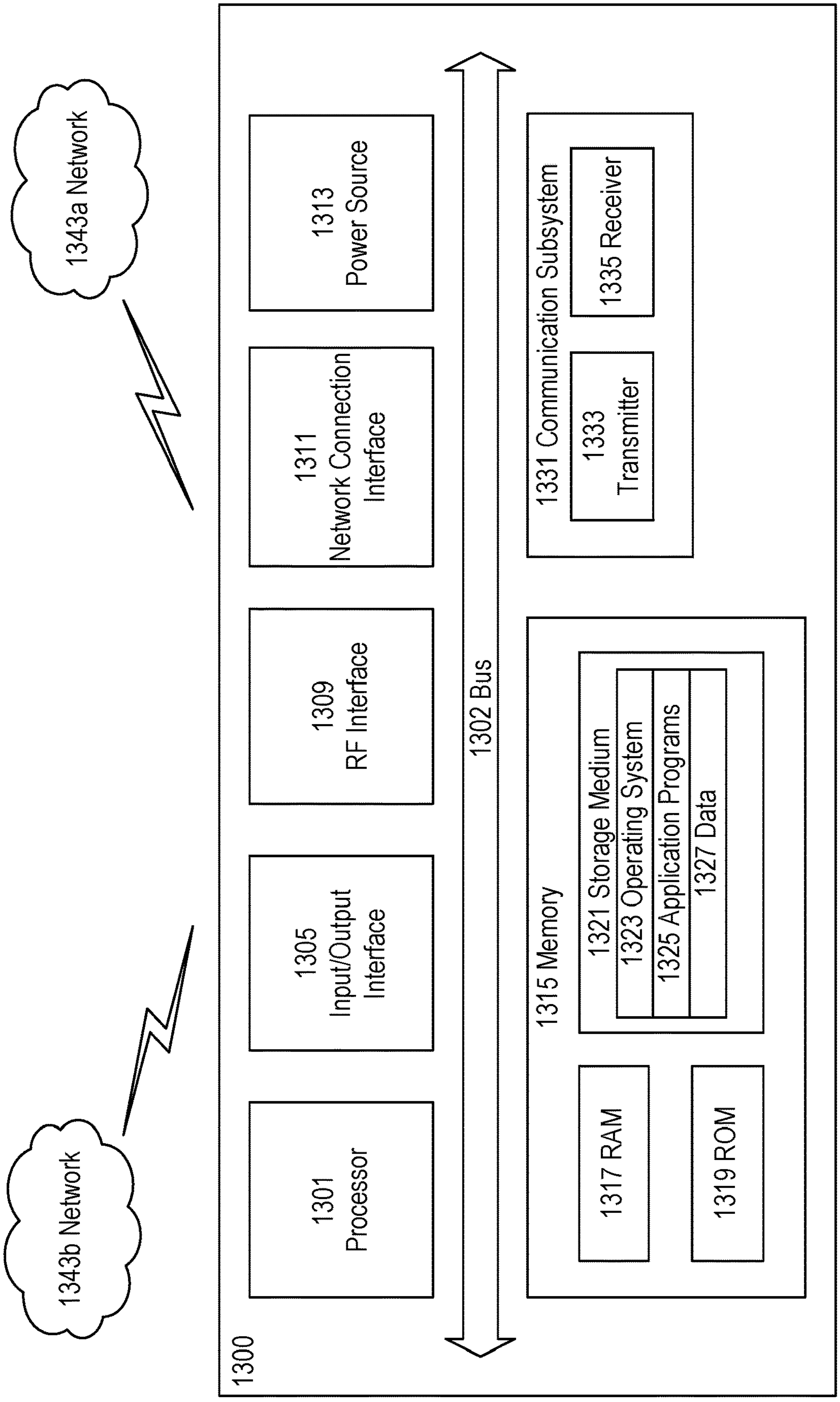
FIG. 13 shows a UE in accordance with some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1300 may be any UE identified by the 3$^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa. The UE in FIG. 13 can operate as a relay UE or as a remote UE as described herein.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343*a*. Network 1343*a* may encompass wired and/or wireless networks such as a local-area network (LAN), a wide-area network (WAN), a computer network, a wireless network, a telecommunications network, another like network or any combination thereof. For example, network 1343*a* may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network inks (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343*b* using communication subsystem 1331. Network 1343*a* and network 1343*b* may be the same network or networks or different network or networks. Communication subsystem 1331 may be configured to include one or more transceivers used to communicate with network 1343*b*. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343*b* may encompass wired and/or wireless networks such as a local-area network (LAN), a wide-area network (WAN), a computer network, a wireless network, a telecommunications network, another like network or any combination thereof. For example, network 1343*b* may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
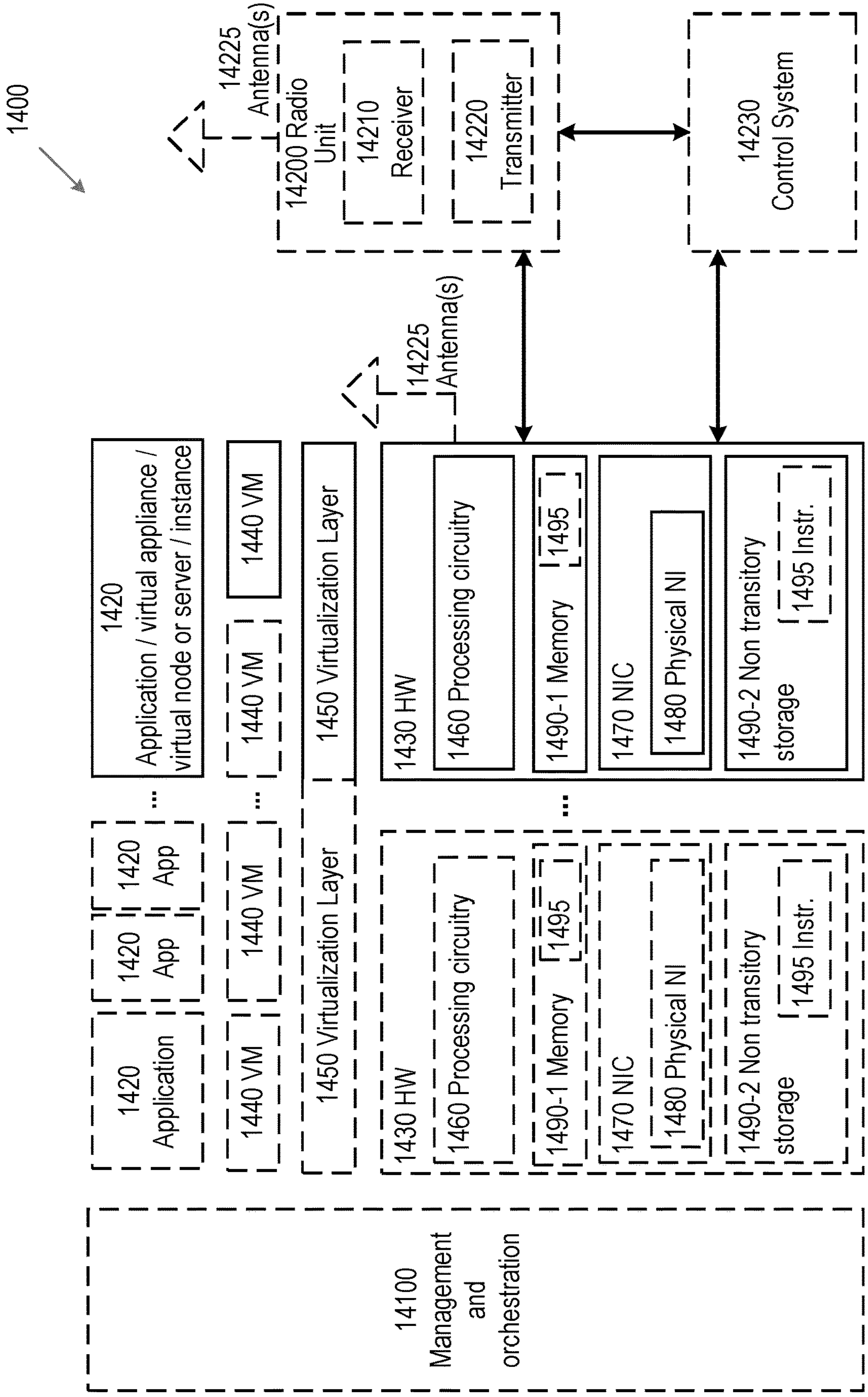
FIG. 14 is a block diagram illustrating a virtualization environment in which functions implemented by some embodiments may be virtualized.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
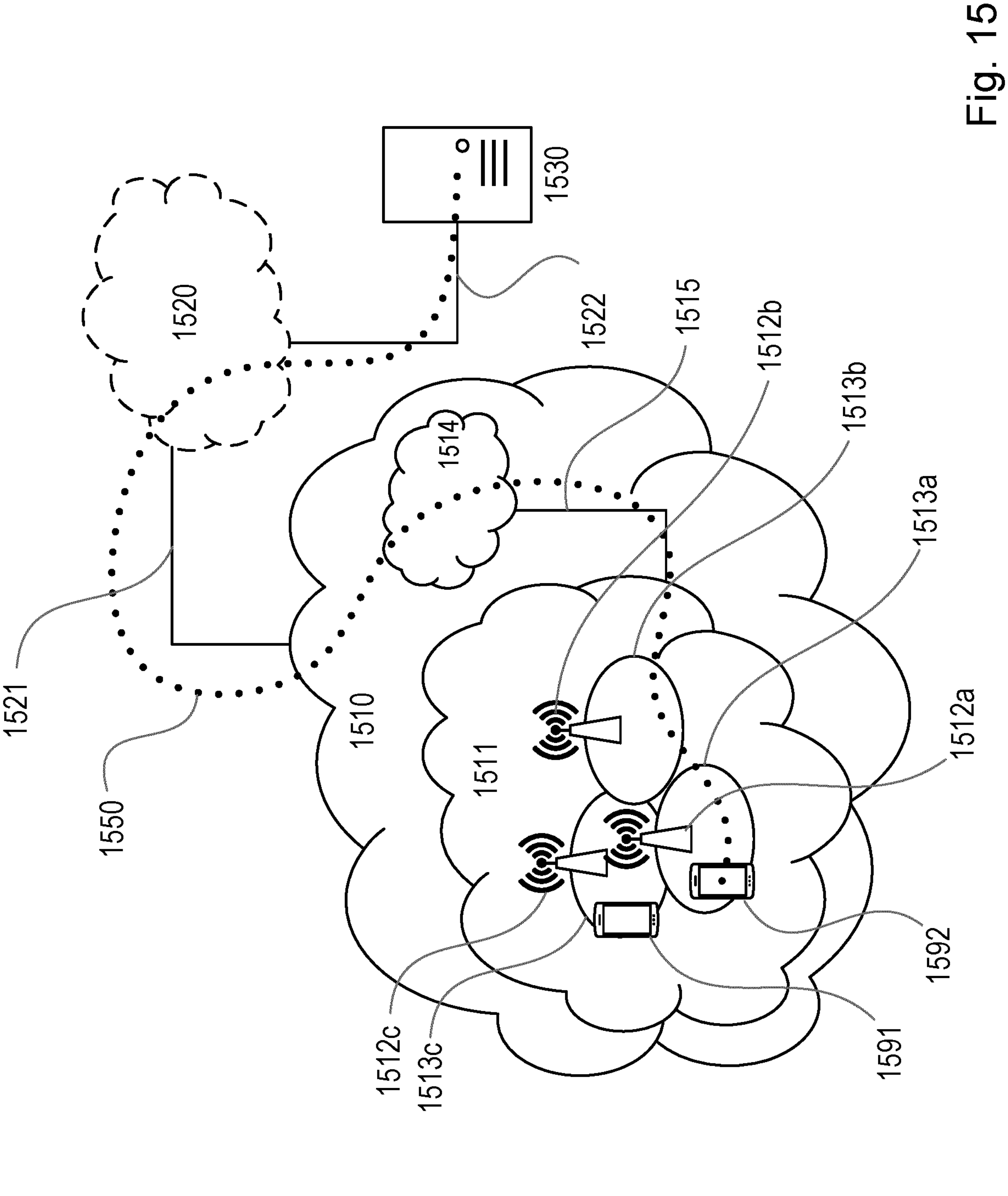
FIG. 15 shows a telecommunication network connected via an intermediate network to a hist computer in accordance with some embodiments.

FIG. 15 shows a telecommunication network connected via an intermediate network to a host computer in accordance with some embodiments.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513*c* is configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; Intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signalling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
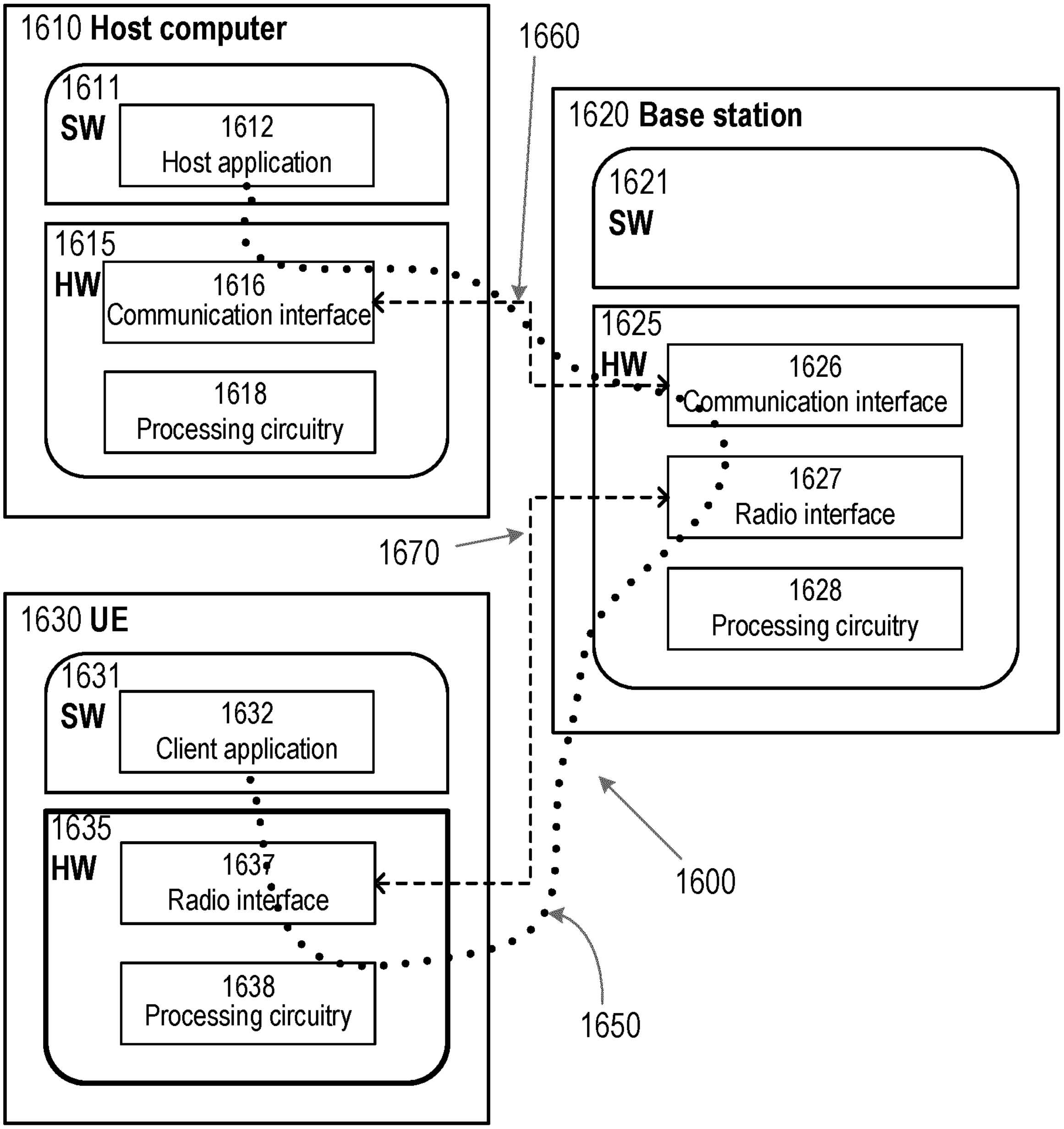
FIG. 16 shows a host computer communicating via a base station with a user equipment over a partially wireless connection in accordance with some embodiments.

FIG. 16 shows a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or It may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512*a*, 1512*b*, 1512*c* and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may enable the remote UE to identify the correct SIB information to apply to the communication fink, and therefore communications with the network may be more reliable and/or effective.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signalling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
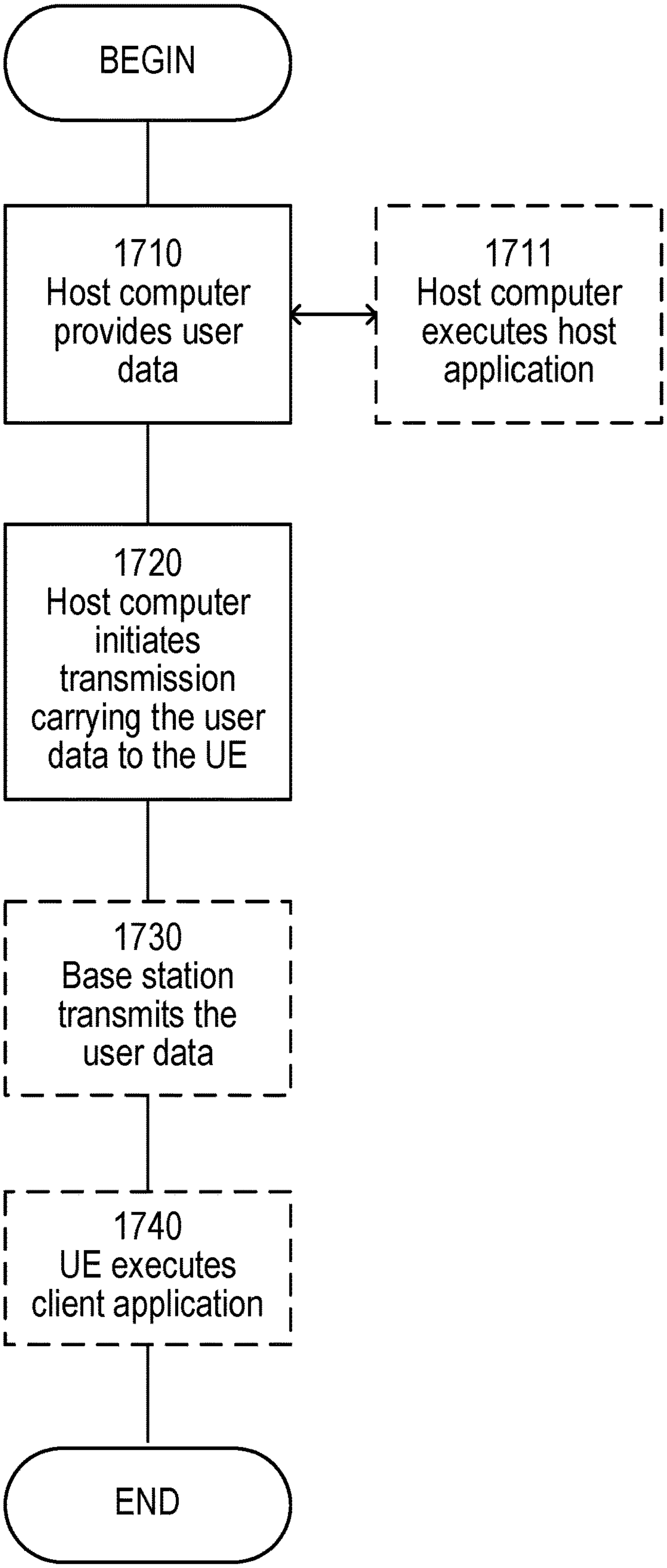
FIGS. 17-20 show various methods implemented in a communication system including a host computer, a base station and a user equipment in accordance with some embodiments.

FIG. 17 shows methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was caried in the transmission that the host computer initiated, in accordance with the teachings of the embodiments described throughout this disclosure. In step 1740 (which may also be optional), the UE executes a client application associated with the host application executed by the host computer.

Figure 18:
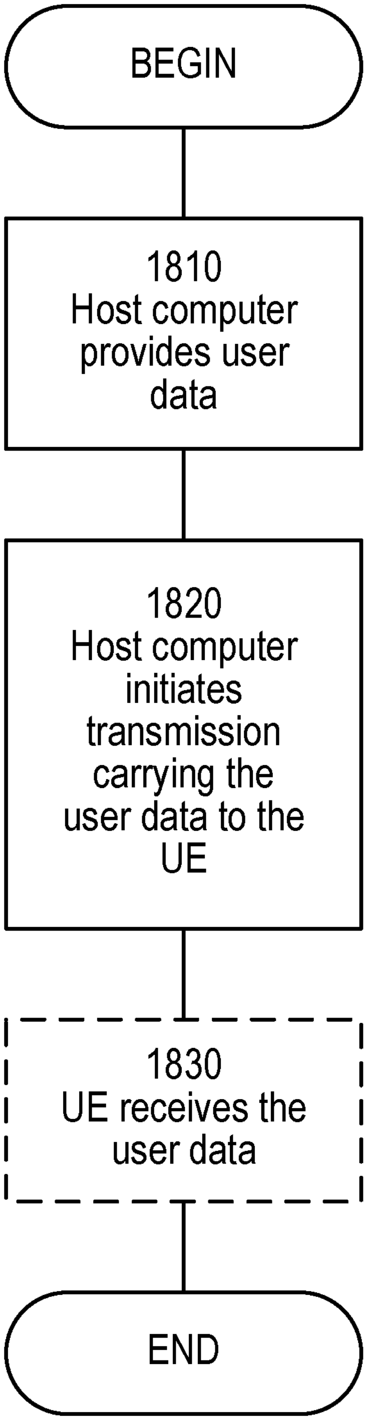

FIG. 18 shows methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
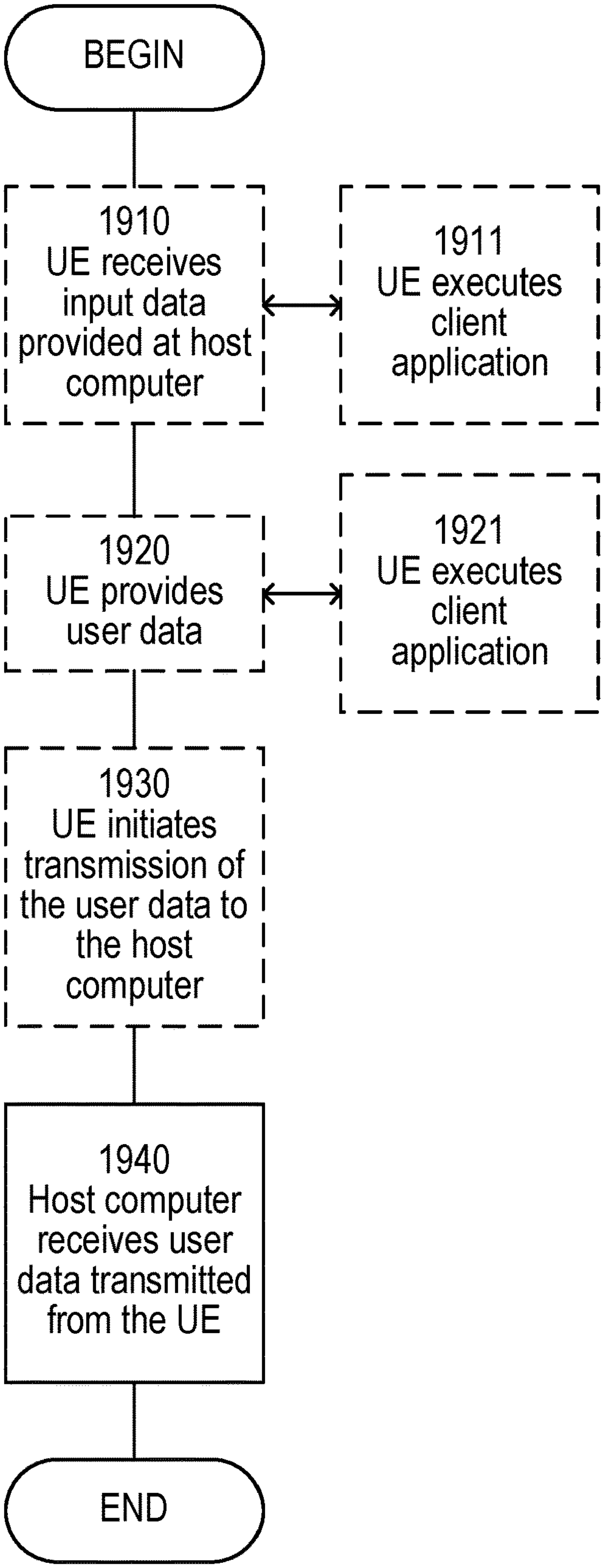

FIG. 19 shows methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
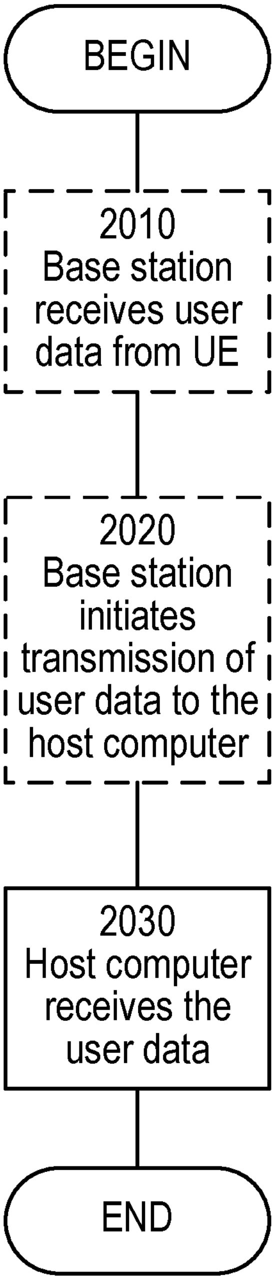

FIG. 20 shows methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiment

1. A method performed by a first wireless device for managing received system information blocks, SIBs, wherein the first wireless device has a direct signaling connection to a base station, and an indirect signalling connection to the base station via a relay wireless device, the method in the first wireless device comprising:
   receiving a SIB of a first type from the base station and receiving another SIB of the first type from the relay wireless device; and
   applying system information, SI, comprised in one of the received SIBs.
2. The method of embodiment 1, wherein the step of applying SI comprises one of.
   a. applying the SI comprised in the SIB received from the base station, and optionally discarding the SIB received from the relay wireless device;
   b. applying the SI comprised in the SIB received from the relay wireless device, and optionally discarding the SIB received from the base station;
   c. applying the SI comprised in the earliest/first received SIB, and optionally discarding the latest/most recently/second received SIB;

d. applying the SI comprised in the latest/most recently/second received SIB, and optionally discarding the earliest/first received SIB; and e. discarding the SIBs received from the base station and the relay wireless device.

3. The method of embodiment 1, wherein the method further comprises:

determining if the SIB received from the relay wireless device comprises an indication that the content of the SIB received from the relay wireless device is different to the content of the SIB received from the base station.

4. The method of embodiment 3, wherein the step of applying SI comprises:

applying the SI comprised in the SIB received from the relay wireless device if the SIB received from the relay wireless device comprises the indication, and optionally discarding the SIB received from the base station.

5. The method of embodiment 3 or 4, wherein the indication comprises a value of a bit in the SIB, a timestamp indicating a time that the SIB was created, and/or information on SI that is different in the SIB received from the relay wireless device to SI in the SIB received from the base station.

6. The method of any of embodiments 1-5, wherein the SIB received from the base station and the SIB received from the relay wireless device are received in the same modification period.

7. The method of any of embodiments 1-6, wherein the SIB received from the base station is received via dedicated signaling or broadcast signaling.

8. A method performed by a first wireless device for managing received system information blocks, SIBs, wherein the first wireless device has a direct signalling connection to a base station and an indirect signalling connection to the base station via a relay wireless device, the method in the first wireless device comprising:

receiving a SIB of a first type from the base station;

receiving a SIB of a second type from the relay wireless device; and applying the system information, SI, comprised in the received SIBs.

9. The method of embodiment 8, wherein the SIB of the first type comprises non-relay-related SI and the SIB of the second type comprises relay-related SI.

10. The method of embodiment 9, wherein the method further comprises one or both of:

transmitting an indication to the relay wireless device to indicate that the relay wireless device is to provide one or more SIBs comprising relay-related SI to the first wireless device; and transmitting an indication to the base station to indicate that the base station is to provide one or more SIBs comprising non-relay-related SI to the first wireless device.

11. The method of embodiment 9 or 10, wherein the method further comprises one or both of stopping acquiring one or more SIBs comprising relay-related SI from the base station; and stopping acquiring one or more SIBs comprising non-relay-related SI from the relay wireless device.

12. The method of embodiment 11, wherein the step of stopping acquiring one or more SIBs comprising relay-related SI from the base station comprises transmitting an indication to the RAN node that the base station is to stop transmitting one or more SIBs comprising relay-related SI to the first wireless device.

13. A method performed by a first wireless device for managing received system information blocks, SIBs, wherein the first wireless device has a direct signalling connection to a base station and an indirect signalling connection to the base station via a relay wireless device, the method in the first wireless device comprising:

receiving one or more SIBs from the base station;

transmitting an indication to the relay wireless device that the relay wireless device is not to transmit SIBs to the first wireless device; and applying the system information, SI, comprised in the received SIBs.

14. The method of any of embodiments 1-13 when dependent on embodiment 2 or 3, wherein the method further comprises:

receiving, from the relay wireless device or the base station, an indication of which of a., b., c., d., and the step of determining are to be performed to apply the SI comprised in one of the received SIBs.

15. A method performed by a relay wireless device, wherein a first wireless device has a direct signalling connection to a base station, and an indirect signalling connection to the base station via the relay wireless device, the method in the relay wireless device comprising:

receiving a system information block, SIB, from the base station;

adding and/or changing system information, SI, in the SIB to form a further SIB that includes an indication that content of the further SIB is different to the content of the SIB received from the base station; and sending the further SIB to the first wireless device.

16. The method of embodiment 15, wherein the indication comprises a value of a bit in the further SIB, a timestamp indicating a time that the further SIB was created, and/or information on SI that is different in the further SIB to the SIB received from the base station.

17. A method performed by a relay wireless device, wherein a first wireless device has a direct signaling connection to a base station and an indirect signalling connection to the base station via the relay wireless device, the method in the relay wireless device comprising:

transmitting one or more system information blocks, SIBs, to the first wireless device, the SIB(s) comprising relay-related system information, SI.

18. The method of embodiment 17, wherein the method further comprises:

receiving an indication from the first wireless device to indicate that the relay wireless device is to provide one or more SIBs comprising relay-related SI to the first wireless device.

19. A method performed by a relay wireless device, wherein a first wireless device has a direct signaling connection to a base station and an indirect signalling connection to the base station via the relay wireless device, the method in the relay wireless device comprising:

receiving an indication from the first wireless device indicating that the relay wireless device is not to transmit system information blocks, SIBs, to the first wireless device; and stopping the transmission of SIBs to the first wireless device.

20. The method of any of embodiments 15-19, wherein the method further comprises:
transmitting an indication to the first wireless device to indicate which of a., b., c., d. in embodiment 2 and/or the step of determining in embodiment 3 are to be performed to apply SI comprised in one or more SIBs received by the first wireless device.

21. The method of any of the previous embodiments, further comprising:
providing user data; and
forwarding the user data to a host computer via a transmission directly to the base station or a transmission indirectly to the base station via the relay wireless device.

Group B Embodiments

22. A method performed by a base station, wherein a first wireless device has a direct signalling connection to the base station, and an indirect signalling connection to the base station via a relay wireless device, the method in the base station comprising:
receiving an indication from the first wireless device to indicate that the base station is to stop providing one or more system information blocks, SIBs, comprising relay-related system information, SI, to the first wireless device; and
transmitting one or more SIBs comprising non-relay-related SI to the first wireless device.

23. The method of embodiment 22, wherein the method further comprises:
broadcasting one or more SIBs comprising relay-related SI.

24. The method of embodiment 22 or 23, wherein the method further comprises:
transmitting an indication to the first wireless device to indicate which of a., b., c., d. in embodiment 2 and/or the step of determining in embodiment 3 are to be performed to apply SI comprised in one or more SIBs received by the first wireless device.

25. The method of any of embodiments 22-24, further comprising:
obtaining user data; and
forwarding the user data to a host computer or the first wireless device directly or indirectly via the relay wireless device.

Group C Embodiments

26. A wireless device, the wireless device comprising:
processing circuitry configured to perform any of the steps of any of the Group A embodiments; and
power supply circuitry configured to supply power to the wireless device.

27. A base station, the base station comprising:
processing circuitry configured to perform any of the steps of any of the Group B embodiments;
power supply circuitry configured to supply power to the base station.

28. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

29. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

30. The communication system of the previous embodiment further including the base station.

31. The communication system of the previous 2 embodiments, further including the UE, wherein the UE is configured to communicate with the base station.

32. The communication system of the previous 3 embodiments, wherein:
the processing circuitry of the host computer is configured to execute a host application, thereby providing the user data; and
the UE comprises processing circuitry configured to execute a client application associated with the host application.

33. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

34. The method of the previous embodiment, further comprising, at the base station, transmitting the user data.

35. The method of the previous 2 embodiments, wherein the user data is provided at the host computer by executing a host application, the method further comprising, at the UE, executing a client application associated with the host application.

36. A user equipment (UE) configured to communicate with a base station, the UE comprising a radio interface and processing circuitry configured to performs any of the previous 3 embodiments.

37. A communication system including a host computer comprising:
processing circuitry configured to provide user data; and
a communication interface configured to forward user data to a cellular network for transmission to a user equipment (UE), wherein the UE comprises a radio interface and processing circuitry, the UE's components configured to perform any of the steps of any of the Group A embodiments.

38. The communication system of the previous embodiment, wherein the cellular network further includes a base station configured to communicate with the UE.

39. The communication system of the previous 2 embodiments, wherein:

the processing circuitry of the host computer is configured to execute a host application, thereby providing the user data; and the UE's processing circuitry is configured to execute a client application associated with the host application.

40. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

41. The method of the previous embodiment, further comprising at the UE, receiving the user data from the base station.

42. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

43. The communication system of the previous embodiment, further including the UE.

44. The communication system of the previous 2 embodiments, further including the base station, wherein the base station comprises a radio interface configured to communicate with the UE and a communication interface configured to forward to the host computer the user data carried by a transmission from the UE to the base station.

45. The communication system of the previous 3 embodiments, wherein:

the processing circuitry of the host computer is configured to execute a host application; and the UE's processing circuitry is configured to execute a client application associated with the host application, thereby providing the user data.

46. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

47. A method implemented in a communication system including a host computer, a base station and a user equipment (UE), the method comprising:

at the host computer, receiving user data transmitted to the base station from the UE, wherein the UE performs any of the steps of any of the Group A embodiments.

48. The method of the previous embodiment, further comprising, at the UE, providing the user data to the base station.

49. The method of the previous 2 embodiments, further comprising:

at the UE, executing a client application, thereby providing the user data to be transmitted; and at the host computer, executing a host application associated with the client application.

50. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

51. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

52. The communication system of the previous embodiment further including the base station.

53. The communication system of the previous 2 embodiments, further including the UE, wherein the UE is configured to communicate with the base station.

54. The communication system of the previous 3 embodiments, wherein:

the processing circuitry of the host computer is configured to execute a host application;

the UE is configured to execute a client application associated with the host application, thereby providing the user data to be received by the host computer.

55. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

56. The method of the previous embodiment, further comprising at the base station, receiving the user data from the UE.

57. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| CBR | Channel Busy Ratio |
| DFN | Direct Frame Number |
| IE | Information Element |
| NSPS | National Security and Public Safety |
| OoC | Out-of-Coverage |
| PDCP | Packet Data Convergence Protocol |
| PDU | Protocol Data Unit |
| PHY | Physical (layer) |
| PL | Path Loss |
| ProSe | Proximity Services |
| PSCCH | Physical Sidelink Control Channel |
| PSSCH | Physical Sidelink Shared Channel |
| RL | Relay |
| RLC | Radio link control |
| RM | Remote |
| RI | Rank Indicator |
| RX | Receive, receiver |
| SINR | Signal to interference noise ratio |
| SL | Sidelink |
| SLRB | Sidelink Radio Bearer |
| SLSS | Sidelink Synchronization Signals |
| SynchUE | Synchronization UE |
| TETRA | Terrestrial Trunked Radio |
| TX | Transmit, transmitter |
| V2V | Vehicle-to-vehicle |
| V2X | Vehicle-to-anything |
| 1x RTT | CDMA2000 1x Radio Transmission Technology |
| 3GPP | 3rd Generation Partnership Project |
| 5G | 5th Generation |
| ABS | Almost Blank Subframe |
| ARQ | Automatic Repeat Request |
| AWGN | Additive White Gaussian Noise |
| BCCH | Broadcast Control Channel |
| BCH | Broadcast Channel |
| CA | Carrier Aggregation |
| CC | Carrier Component |
| CCCH SDU | Common Control Channel SDU |
| LOS | Line of Sight |
| LPP | LTE Positioning Protocol |
| LTE | Long-Term Evolution |
| MAC | Medium Access Control |
| MBMS | Multimedia Broadcast Multicast Services |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MSC | Mobile Switching Center |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |

| | |
|---|---|
| CDMA | Code Division Multiplexing Access |
| CGI | Cell Global Identifier |
| CIR | Channel Impulse Response |
| CP | Cyclic Prefix |
| CPICH | Common Pilot Channel |
| CPICH Ec/No | CPICH Received energy per chip divided by the power density in the band |
| CQI | Channel Quality information/indicator |
| C-RNTI | Cell RNTI |
| CSI | Channel State Information |
| DCCH | Dedicated Control Channel |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| FFS | For Further Study |
| GERAN | GSM EDGE Radio Access Network |
| gNB | Base station in NR |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| RAT | Radio Access Technology |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SNR | Signal to Noise Ratio |
| SON | Self Optimized Network |

-continued

| | | | |
|---|---|---|---|
| PCell | Primary Cell | SS | Synchronization Signal |
| PCFICH | Physical Control Format Indicator Channel | SSS | Secondary Synchronization Signal |
| PDCCH | Physical Downlink Control Channel | TDD | Time Division Duplex |
| | | TDOA | Time Difference of Arrival |
| PDP | Profile Delay Profile | TOA | Time of Arrival |
| PDSCH | Physical Downlink Shared Channel | TSS | Tertiary Synchronization Signal |
| | | TTI | Transmission Time Interval |
| PGW | Packet Gateway | UE | User Equipment |
| PHICH | Physical Hybrid-ARQ Indicator Channel | UL | Uplink |
| | | UMTS | Universal Mobile Telecommunication System |
| PLMN | Public Land Mobile Network | | |
| PMI | Precoder Matrix Indicator | USIM | Universal Subscriber Identity Module |
| PRACH | Physical Random Access Channel | | |
| | | UTDOA | Uplink Time Difference of Arrival |
| PRS | Positioning Reference Signal | | |
| PSS | Primary Synchronization Signal | UTRA | Universal Terrestrial Radio Access |
| PUCCH | Physical Uplink Control Channel | | |
| PUSCH | Physical Uplink Shared Channel | UTRAN | Universal Terrestrial Radio Access Network |
| RACH | Random Access Channel | | |
| QAM | Quadrature Amplitude Modulation | WCDMA | Wide CDMA |
| | | WLAN | Wide Local Area Network |
| RAN | Radio Access Network | | |

The invention claimed is:

1. A method performed by a remote wireless device for managing received system information blocks (SIBs), wherein the remote wireless device has a direct signaling connection to a base station and an indirect signaling connection to the base station via a relay wireless device, the method comprising:
 - receiving, from the base station over the direct signaling connection, a first SIB comprising non-relay-related System Information (SI);
 - receiving, from the relay wireless device over the indirect signaling connection, a second SIB comprising relay-related SI;
 - applying the SI comprised in the first SIB and second SIB; and
 - stopping acquisition of one or more further SIBs, wherein the stopping comprises:
   - transmitting a first indication to the base station indicating that the base station is to stop relay-related SI transmission, and continuing to receive non-relay related SI transmission from the relay wireless device; and
   - transmitting a second indication to the relay wireless device indicating that the relay wireless device is to stop non-relay related SI transmission and continuing to receive relay-related SI transmission from the base station, wherein the second indication is different from the first indication.

2. The method of claim 1, further comprising transmitting an indication to the relay wireless device to indicate that the relay wireless device is to provide the second SIB comprising the relay-related SI to the remote wireless device.

3. The method of claim 1, further comprising transmitting an indication to the base station to indicate that the base station is to provide the first SIB comprising non-relay-related SI to the remote wireless device.

4. A method performed by a relay wireless device, the method comprising:
 - receiving an indication from a remote wireless device to indicate that the relay wireless device is to stop transmitting one or more first system information blocks (SIBs) comprising non-relay related system information (SI) to a remote wireless device; and
 - continuing to transmit one or more second SIBs comprising relay-related SI to the remote wireless device, wherein the remote wireless device has a direct signaling connection to a base station and an indirect signaling connection to the base station via the relay wireless device.

5. The method of claim 4, further comprising receiving an indication from the remote wireless device to indicate that the relay wireless device is to provide the one or more second SIBs comprising the relay-related SI to the remote wireless device.

6. The method of claim 4, further comprising indicating, to the remote wireless device, an action to perform to apply SI comprised in one or more of the SIBs received by the remote wireless device.

7. The method of claim 6, wherein the action to perform to apply the SI comprises:
 - apply the SI comprised in a SIB received from the base station, and discard a SIB received from the relay wireless device; or
 - apply the SI comprised in a SIB received from the relay wireless device, and discard a SIB received from the base station; or
 - apply the SI comprised in an earliest received SIB, and discard a most recently received SIB; or
 - apply the SI comprised in a most recently received SIB, and discard an earliest received SIB; or
 - discard SIBs received from the base station and the relay wireless device; or
 - determine whether a SIB received from the relay wireless device indicates that a content of the SIB received from the relay wireless device is different to the content of the SIB received from the base station.

8. A method performed by a base station, the method comprising:
 - receiving an indication from a remote wireless device to indicate that the base station is to stop providing one or more system information blocks (SIBs) comprising relay-related system information (SI) to the remote wireless device; and
 - continuing to transmit one or more SIBs comprising non-relay-related SI to a wireless device;
 - wherein the base station is connected to the remote wireless device by:

a direct signaling connection; and an indirect signaling connection via a relay wireless device.

9. The method of claim 8, further comprising broadcasting one or more SIBs comprising relay-related SI.

10. The method of claim 8, further comprising indicating, to the remote wireless device, an action to perform to apply SI comprised in one or more SIBs received by the remote wireless device.

11. The method of claim 10, wherein the action comprises:

apply the SI comprised in a SIB received from the base station, and discard a SIB received from the relay wireless device; or apply the SI comprised in a SIB received from the relay wireless device, and discard a SIB received from the base station; or apply the SI comprised in an earliest received SIB, and discard a most recently received SIB; or apply the SI comprised in a most recently received SIB, and discard an earliest received SIB; or discard SIBs received from the base station and the relay wireless device; or determine whether a SIB received from the relay wireless device indicates that a content of the SIB received from the relay wireless device is different to the content of the SIB received from the base station.

12. A remote wireless device for managing received system information blocks (SIBs), the remote wireless device comprising:

processing circuitry and memory, the memory containing instructions executable by the processing circuitry whereby the remote wireless device is configured to:

receive, from a base station over a direct signaling connection, a first SIB comprising non-relay-related System Information (SI);

receive, from a relay wireless device over an indirect signaling connection, a second SIB comprising relay-related SI;

apply the SI comprised in the first SIB and second SIB;

stop acquisition of one or more further SIBs, wherein to stop the acquisition, the processing circuitry is configured to:

transmit a first indication to the base station indicating that the base station is to stop relay-related SI transmission, and continue to receive non-relay related SI transmission from the relay wireless device; and transmit a second indication to the relay wireless device indicating that the relay wireless device is to stop non-relay related SI transmission and continue to receive relay-related SI transmission from the base station, wherein the second indication is different from the first indication; and wherein the remote wireless device has a direct signaling connection to the base station and the indirect signaling connection to the base station via the relay wireless device.

13. The remote wireless device of claim 12, wherein the remote wireless device is further configured to transmit an indication to the relay wireless device to indicate that the relay wireless device is to provide the second SIB comprising the relay-related SI to the remote wireless device.

14. The remote wireless device of claim 12, wherein the remote wireless device is further configured to transmit an indication to the base station to indicate that the base station is to provide the first SIB comprising non-relay-related SI to the remote wireless device.

15. A relay wireless device comprising:

processing circuitry and memory, the memory comprising instructions executable by the processing circuitry whereby the relay wireless device is configured to:

receive an indication from a remote wireless device to indicate that the relay wireless device is to stop transmitting one or more first system information blocks (SIBs) comprising non-relay related system information (SI) to the remote wireless device; and continue to transmit one or more second SIBs comprising relay-related SI to the remote wireless device, wherein the remote wireless device has a direct signaling connection to a base station and an indirect signaling connection to the base station via the relay wireless device.

16. The relay wireless device of claim 15, wherein the relay wireless device is further configured to receive an indication from the remote wireless device to indicate that the relay wireless device is to provide the one or more second SIBs comprising the relay-related SI to the remote wireless device.

17. The relay wireless device of claim 15, wherein the relay wireless device is further configured to further indicate, to the remote wireless device, an action to perform to apply the SI comprised in one or more of the SIBs received by the remote wireless device.

18. The relay wireless device of claim 17, wherein the action to perform to apply the SI comprises:

applying the SI comprised in a SIB received from the base station, and discard a SIB received from the relay wireless device; or applying the SI comprised in a SIB received from the relay wireless device, and discard a SIB received from the base station; or applying the SI comprised in an earliest received SIB, and discard a most recently received SIB; or applying the SI comprised in a most recently received SIB, and discard an earliest received SIB; or discarding SIBs received from the base station and the relay wireless device; or determining whether a SIB received from the relay wireless device indicates that a content of the SIB received from the relay wireless device is different to the content of the SIB received from the base station.

19. A base station comprising:

processing circuitry and memory, the memory containing instructions executable by the processing circuitry whereby the base station is configured to:

receive an indication from a remote wireless device to indicate that the base station is to stop providing one or more system information blocks (SIBs) comprising relay-related system information (SI) to the remote wireless device; and continue to transmit one or more SIBs comprising non-relay-related SI to the remote wireless device, the base station being connected to the remote wireless device by:

a direct signaling connection; and an indirect signaling connection via a relay wireless device.

20. The base station of claim 19, wherein the base station is further configured to broadcast one or more SIBs comprising relay-related SI.

21. The base station of claim 19, wherein the base station is further configured to indicate, to the remote wireless device, an action to perform to apply SI comprised in one or more SIBs received by the remote wireless device.

22. The base station of claim 21, wherein the action comprises:

applying the SI comprised in a SIB received from the base station, and discard a SIB received from the relay wireless device; or applying the SI comprised in a SIB received from the relay wireless device, and discard a SIB received from the base station; or applying the SI comprised in an earliest received SIB, and discard a most recently received SIB; or applying the SI comprised in a most recently received SIB, and discard an earliest received SIB; or discarding SIBs received from the base station and the relay wireless device; or determining whether a SIB received from the relay wireless device indicates that a content of the SIB received from the relay wireless device is different to the content of the SIB received from the base station.

* * * * *